(12) United States Patent
Sumner

(10) Patent No.: US 8,689,490 B2
(45) Date of Patent: Apr. 8, 2014

(54) REFLECTIVE ENERGY MANAGEMENT SYSTEM

(76) Inventor: Walton Sumner, Webster Groves, MO (US)

( * ) Notice: Subject to any disclaimer, the term of this patent is extended or adjusted under 35 U.S.C. 154(b) by 229 days.

(21) Appl. No.: 13/061,358

(22) PCT Filed: Sep. 8, 2009

(86) PCT No.: PCT/US2009/056241
§ 371 (c)(1),
(2), (4) Date: Feb. 28, 2011

(87) PCT Pub. No.: WO2010/028374
PCT Pub. Date: Mar. 11, 2010

(65) Prior Publication Data
US 2011/0167735 A1      Jul. 14, 2011

Related U.S. Application Data

(60) Provisional application No. 61/095,024, filed on Sep. 8, 2008.

(51) Int. Cl.
*E04H 9/00* (2006.01)

(52) U.S. Cl.
USPC .................................. 52/1; 52/173.3; 126/622

(58) Field of Classification Search
USPC .............. 52/1, 173.3, 66, 22; 47/17; 126/621, 126/622, 628
See application file for complete search history.

(56) References Cited

U.S. PATENT DOCUMENTS

| | | |
|---|---|---|
| 2,857,634 A | 10/1958 | Garbade et al. |
| 3,884,414 A | 5/1975 | Baer |
| 3,946,944 A | 3/1976 | Keyes et al. |
| 3,952,724 A | 4/1976 | Pei |
| 3,964,268 A | 6/1976 | DiPeri |

(Continued)

FOREIGN PATENT DOCUMENTS

| | | |
|---|---|---|
| JP | 10-131411 | 5/1998 |
| JP | 2001-032458 | 2/2001 |
| JP | WO 2007-057870 | 5/2007 |
| KR | 20-1987-000173 | 5/1987 |

OTHER PUBLICATIONS

Amvicsystem, SilveRBoard, May 3, 2008, Technical Installation Manual.*

*Primary Examiner* — Jeanette E Chapman
*Assistant Examiner* — Daniel Kenny
(74) *Attorney, Agent, or Firm* — Spencer Fane Britt & Browne LLP

(57) ABSTRACT

A four component roofing system uses three reflective subsystems and one radiant subsystem to provide passive temperature control of a building comprising: (1) Shingles that reflect high angle summer sun light back to the sky, but absorb low angle winter sunlight; (2) A temperature sensitive attic insulator placed under a sunlit roof that reflects radiation and blocks convection from the roof to the attic at hot temperatures, permits radiation and convection at warm temperatures, and blocks radiation and convection from the attic at cold temperatures; (3) A temperature sensitive attic insulator placed under a shaded roof that permits radiation and convection at warm or hot temperatures, and blocks radiation and convection from the attic at cold temperatures; (4) Non-reflective shingles on a shaded roof that emit radiation continuously, but that are heated by air and radiation from the attic only when the second temperature sensitive attic insulator permits convection, so that radiant heat loss is reduced at cold temperatures.

16 Claims, 16 Drawing Sheets

(56) References Cited

U.S. PATENT DOCUMENTS

| | | | |
|---|---|---|---|
| 3,964,464 A | 6/1976 | Hockman | |
| 3,966,308 A | 6/1976 | Nilson | |
| 3,971,359 A | 7/1976 | Bourne | |
| 3,987,782 A | 10/1976 | Meier, Jr. | |
| 3,994,279 A | 11/1976 | Barak | |
| 3,994,435 A | 11/1976 | Barr | |
| 4,004,574 A | 1/1977 | Barr | |
| 4,007,729 A | 2/1977 | Chao et al. | |
| 4,027,653 A | 6/1977 | Meckler | |
| 4,046,867 A * | 9/1977 | Seeling et al. | 423/543 |
| 4,047,517 A | 9/1977 | Arnberg | |
| 4,055,956 A | 11/1977 | Matovich, Jr. | |
| 4,081,966 A | 4/1978 | deGeus | |
| 4,100,914 A | 7/1978 | Williams | |
| 4,111,360 A | 9/1978 | Barr | |
| 4,120,285 A | 10/1978 | Nugent | |
| 4,126,123 A | 11/1978 | Hall | |
| 4,127,453 A | 11/1978 | Radebold | |
| 4,128,124 A | 12/1978 | Worthington | |
| 4,135,489 A | 1/1979 | Jarvinen | |
| 4,143,233 A | 3/1979 | Kapany et al. | |
| 4,144,095 A | 3/1979 | Mlavsky | |
| 4,150,785 A | 4/1979 | Briscoe | |
| RE30,027 E | 6/1979 | Hockman | |
| 4,159,017 A | 6/1979 | Novi | |
| 4,184,295 A | 1/1980 | Hicks | |
| 4,198,955 A | 4/1980 | Dorbeck | |
| 4,213,305 A | 7/1980 | De Geus | |
| 4,231,772 A | 11/1980 | Berg | |
| 4,235,048 A | 11/1980 | Gillery | |
| 4,279,240 A | 7/1981 | Artusy | |
| 4,295,463 A | 10/1981 | Citron | |
| 4,301,787 A | 11/1981 | Rice | |
| 4,313,650 A * | 2/1982 | Ward et al. | 359/596 |
| 4,332,239 A | 6/1982 | Hotine | |
| 4,338,991 A | 7/1982 | Sigworth, Jr. | |
| 4,343,294 A | 8/1982 | Daniel | |
| 4,355,682 A | 10/1982 | Maloney | |
| 4,365,620 A | 12/1982 | Bliamptis | |
| 4,372,196 A | 2/1983 | Henderson | |
| 4,375,183 A | 3/1983 | Lynch | |
| 4,387,704 A | 6/1983 | Minden | |
| 4,392,359 A | 7/1983 | Franklin | |
| 4,401,103 A | 8/1983 | Thompson | |
| 4,410,757 A * | 10/1983 | Stamminger et al. | 136/248 |
| 4,451,514 A | 5/1984 | Hunt | |
| 4,452,228 A | 6/1984 | Meyer | |
| 4,452,232 A | 6/1984 | David | |
| 4,461,277 A | 7/1984 | Pardo | |
| 4,462,452 A * | 7/1984 | Oskam | 160/176.1 R |
| 4,523,575 A | 6/1985 | Nikkel et al. | |
| 4,527,544 A | 7/1985 | Wolf et al. | |
| 4,534,335 A | 8/1985 | Rice | |
| 4,559,925 A | 12/1985 | Snow | |
| 4,604,990 A | 8/1986 | Nikkel et al. | |
| 4,655,195 A | 4/1987 | Boynton | |
| 4,685,307 A | 8/1987 | Jones | |
| 4,700,013 A | 10/1987 | Soule | |
| 4,733,506 A * | 3/1988 | Gunnarshaug | 52/22 |
| 4,773,191 A | 9/1988 | Slack | |
| 4,809,516 A | 3/1989 | Jones | |
| 4,838,038 A | 6/1989 | Uecker et al. | |
| 4,874,225 A | 10/1989 | Pruszenski, Jr. | |
| 4,877,675 A | 10/1989 | Falicoff et al. | |
| 4,909,041 A | 3/1990 | Jones | |
| 4,934,803 A | 6/1990 | Ealey | |
| 5,070,933 A | 12/1991 | Baer | |
| 5,092,101 A | 3/1992 | Kunert | |
| 5,174,128 A | 12/1992 | Bourne et al. | |
| 5,191,876 A | 3/1993 | Atchley | |
| 5,194,113 A | 3/1993 | Lasch et al. | |
| 5,374,317 A | 12/1994 | Lamb et al. | |
| 5,384,994 A | 1/1995 | Borba | |
| 5,423,185 A | 6/1995 | Leung et al. | |
| 5,482,568 A | 1/1996 | Hockaday | |
| 5,511,537 A * | 4/1996 | Hively | 126/702 |
| 5,524,381 A | 6/1996 | Chahroudi | |
| 5,623,919 A | 4/1997 | Kelly | |
| 5,813,168 A * | 9/1998 | Clendening | 47/17 |
| 5,942,280 A | 8/1999 | Mathers et al. | |
| 6,004,415 A | 12/1999 | Ko | |
| 6,080,927 A | 6/2000 | Johnson | |
| 6,097,458 A | 8/2000 | Tsuda et al. | |
| 6,185,742 B1 | 2/2001 | Doherty | |
| 6,250,091 B1 | 6/2001 | Jerome | |
| 6,284,383 B1 | 9/2001 | Nishiyama | |
| 6,367,275 B1 | 4/2002 | Stephan | |
| 6,533,026 B1 | 3/2003 | Noah | |
| 6,575,234 B2 | 6/2003 | Nelson | |
| 6,632,516 B2 | 10/2003 | Aanestad | |
| 6,820,439 B1 | 11/2004 | Marek | |
| 6,923,248 B1 | 8/2005 | Weber et al. | |
| 8,007,898 B2 * | 8/2011 | Bailey et al. | 428/143 |
| 8,024,891 B2 * | 9/2011 | Maria Ruiter | 47/17 |

* cited by examiner

REFLECTIVE ENERGY MANAGEMENT SYSTEM

CROSS-REFERENCE TO RELATED APPLICATIONS

This application claims priority from U.S. Provisional Application Ser. No. 61/095,024 filed on Sep. 8, 2008, which is incorporated herein by reference in its entirety.

FIELD OF THE INVENTION

The present invention describes a four component roofing system using three reflective subsystems and one radiant subsystem to provide passive temperature control of a building comprising: (1) Shingles incorporating a passive solar design that reflect high angle summer sun light hack to the sky, but absorb low angle winter sunlight; (2) A first temperature sensitive attic insulator placed under a sunlit roof that reflects radiation and blocks convection from the roof to the attic at hot temperatures, permits radiation and convection at warm temperatures, and blocks radiation and convection from the attic at cold temperatures; (3) A second temperature sensitive attic insulator placed under a shaded roof that permits radiation and convection at warm or hot temperatures, and blocks radiation and convection from the attic at cold temperatures; (4) Non-reflective shingles on a shaded roof that emit infrared radiation continuously, but that are heated by air and radiation from the attic only when the second temperature sensitive attic insulator permits convection, so that radiant heat loss is reduced at cold temperatures. The system advantageously does not require any external power source, adapts spontaneously to changing weather conditions, mitigates extreme attic temperatures when any subset of the components are correctly installed, generates no waste heat, and can be expected to last several decades with no routine maintenance.

BACKGROUND OF THE INVENTION

Prior art teaches a number of strategies for directly harnessing solar energy. Solar water heaters are especially efficient and inexpensive. Solar electricity generators include solar cells, solar Stirling engines, and arrays of heliostats or parabolic troughs that concentrate solar energy to capture heat that eventually powers a steam-driven electric generator.

A significant disadvantage of all power generation processes is the substantial inefficiency of three typical steps. The first of the three steps is converting energy from a naturally occurring form to a transportable form. The most versatile transportable energy form is electricity. Current typical solar cells for terrestrial use rarely convert even 20% of incident light energy to electricity. More than 90% of the light energy striking a dark solar cell may be lost as waste heat. Combustion of fossil fuels to generate electricity is typically less than 50% efficient. The second of the three steps is moving energy to a location where it performs work. This movement typically occurs by vehicle, pipe, or wire. Vehicles and pipes require energy inputs. High voltage transmission of electricity involves substantial losses of energy. The third of the three steps is the use of the energy to perform work. Typical air conditioners usefully employ a fraction of drawn electrical current to pump heat from a cooled interior space to an exterior space, said exterior space typically comprising the air around an exterior air conditioning unit. The air conditioning unit inevitably generates significant amounts of waste heat. Heat moved from the interior and heat generated by pump raise temperatures in the immediate vicinity of the air conditioning unit, making further cooling harder, because it increases the temperature gradient that the air conditioner must pump against. In heating applications, the third step is typically efficient, but the first and second steps remain wasteful.

A significant disadvantage of solar energy collection devices is the accumulation of waste heat in the vicinity of the energy collection, often occurring in the vicinity of spaces where cooling is desired. The rate of heat transfer between a warmer and a cooler body is proportional to the difference in temperature of said warmer and cooler bodies, regardless of insulation. Insulation reduces the rate of heat transfer for any given temperature difference, but doubling the difference in temperature will double the rate of heat transfer through any fixed insulator. Consequently, trapping or moving heat to an area adjacent to a cooled area increases the rate of return of said heat to the cooled area. Furthermore, fixed insulating layers may retard nighttime cooling Experiments conducted by the inventor demonstrate that in full summer sun, with an ambient temperature below 35 degrees centigrade, the underside of a commercial flexible solar panel driving a water pump reaches a temperature of at least 50 degrees centigrade. In this experiment, a portion of the solar energy reaching the solar panel is diverted to run the pump, and the pump generates waste heat at a distant location. In spite of this energy transfer, the solar panel converts a large amount of solar energy to local heat. The same result is obtained by harnessing all of the power output of a solar panel to drive hydrolysis in a salt solution, presumably diverting as much energy as possible from the solar panel. All existing solar panels integrated in roofing material or awnings must have similar local heating effects. In addition, current solar panels are extremely expensive in terms of monetary cost and energy recovery. Most current solar panels take years to generate as much electricity as was required to make the solar panels.

Prior art teaches various methods for passive cooling. A plurality of patents teach evaporation of a coolant, such as water, in an open or closed system, from a surface to cool the underlying area. Jerome (U.S. Pat. No. 6,250,091) teaches evaporation of precisely applied water, the coolant, from a roof surface. Marek (U.S. Pat. No. 6,820,439) teaches evaporation of water from a film material. De Geus (U.S. Pat. No. 4,213,305) teaches a coolant other than water in a closed system. Any open evaporative cooling system using water increases local humidity, thereby decreasing evaporative cooling of human bodies, thereby increasing the perceived heat of the environment.

Prior art teaches various methods for controlling the heating effects of sunlight. A common use of metallized Mylar® places a sheet of the highly reflective material on the roof of a structure such as a recreational vehicle or mobile home. An experiment reported by the United States Geological Service demonstrates that metallized Mylar® significantly reduces heat gain. A square reflective sheet, 25 meters on each side, was placed over desert sand in the early morning. Temperatures beneath the reflective sheet remained 27 degrees centigrade (about 81 degrees Fahrenheit) while ambient temperatures reached 43 degrees centigrade (about 109 degrees Fahrenheit). The reflective sheet was removed to test a satellite based thermal sensor. Ground personnel documented that the temperature of the exposed sand surface rose to from 27 to 40 degrees centigrade within 20 minutes. This experiment demonstrates a significant cooling effect when a highly reflective surface prevents absorption of solar energy. Under this summer desert condition, a passive 13 degree centigrade cooling effect could transform an area from being oppressively hot to tolerable. Furthermore, this cooling did not occur by moving heat to a second ground level location, but by reflecting solar energy back to the sky. A portion of the reflected solar energy would leave the atmosphere and enter space.

The inventor conducted a similar experiment in 2005 using Mylar affixed to tarps to cover a sunroom, finding that peak summer temperatures could be lowered 10 to 15 degrees Centigrade. Disadvantageously, the apparatus is hard to deploy, the metallized Mylar® deteriorates quickly in wet weather, and reflections from the metallized Mylar® are blinding, so that such sheets must be carefully deployed to avoid reflecting light into the eyes of neighbors or drivers. Other significant disadvantages of metallized Mylar® and similar films are noise generated by distortion in the wind, high flammability, and high electric conductivity. Metallized Mylar® sheets could attract lightening and burst into flames following a strike.

Prior art teaches a set of passive solar principals for home construction. First, a roof may overhang a window facing the equator to such an extent that the roof shades the window from summer sunlight arriving at a high angle, but in the winter permits lower angle incident solar radiation to penetrate the window. In areas with snow cover, some additional solar radiation penetrates the window after reflection from the snow surface. Second, the energy of sunlight entering a window may be captured by absorption in a high thermal mass object, such as black stone or a water mass. Third, window shutters, shades, blinds, or coatings may be used to selectively permit or block radiant energy transfers through a window. A window shade may be open during the day and closed at night to improve heating, for instance. Fourth, metallized polymer sheets, such as Mylar®, are commonly incorporated as insulating materials in fixed positions within well protected layers of construction materials. These reflective sheets reflect radiant heat back to its source. Similar sheets are not used for fixed exterior applications because rain, hail, and blown fine particulate matter rapidly damage the reflective coating or the plastic backing. Furthermore, fine particulate matter that settles on a reflective surface slowly degrades the reflective performance of the surface.

Prior art teaches a number of additional passive solar techniques. Uecker (U.S. Pat. No. 4,838,038) teaches that a cooling appliance may be shaded to reduce the temperature gradient against which it pumps heat. Hicks (U.S. Pat. No. 4,184,295) teaches that a window may be shaded by an awning to reduce the sunlight entering a room through said window. Pardo (U.S. Pat. No. 4,461,277) teaches that a window may have a heat absorbing surface that can be rotated to the outside to prevent interior heating, or to the inside to increase interior heating. Gillery (U.S. Pat. No. 4,235,048) teaches that a film applied to an interior glass surface may absorb or reflect sunlight to prevent warming of the room having said window. Falicoff (U.S. Pat. No. 4,877,675) teaches that a transparent color changing sheet passively controls the temperature of a greenhouse.

Prior art teaches a number of methods related to ceilings and roofing. A white roof coating creates a fixed partially reflective roof. This roof design will reflect large amounts of incident light, thereby cooling the roof and reducing conductive heating of the area covered by the roof. This design is in use in energy efficient demonstration homes in Florida. A first drawback of a fixed partially reflective roof is that the roof radiates a reduced amount of heat at night, compared to a dark roof, following the general principle that good reflectors are poor emitters. A second drawback is that a fixed partially reflective roof reflects large amounts of warming sunlight on cold days. A third drawback of a fixed partially reflective roof, as embodied by a white coated roof, is that on hot days a portion of the sunlight striking the roof is scattered and strikes and warms other objects in the vicinity of the roof, and that a significant portion of the sunlight striking the roof is absorbed and not reflected. Falicoff (U.S. Pat. No. 4,877,675) teaches temperature sensitive changes in the color and opacity of a reflective sheet, overcoming the first two drawbacks but not the third.

Prior art describes a number of mechanisms for temperature sensitive displacement of an object. The most ubiquitous are bimetallic strips, commonly used in thermostats as a component of a physical switch that controls a heating or cooling appliance. Generally, bimetallic strips provide high power, low speed movement. Another set of temperature sensitive mechanisms for motion control include devices that use vapor pressure to shift liquids and gases, and therefore mass balances. Yet another set of temperature sensitive mechanisms for motion control include electromechanical devices.

Prior art teaches that clear, durable coatings of fluoropolymers, such as Teflon® and Tefzil® protect solar panels from weather. A solar panel so enclosed receives light, is as flexible as the silicon substrate, endures impact by hail, is non-flammable, and does not conduct electricity.

BRIEF SUMMARY OF THE INVENTION

The present invention teaches a combination of four roofing components that collectively provide safe, durable, adaptive rejection of heat in the summer and conservation of heat in the winter. The invention combines reflective surfaces, passive solar construction techniques applied on small scales, and durable clear coatings to create passive solar shingles, the first component of the invention. The second component is a shingle designed to radiate infrared energy from a shaded roof. A preferred embodiment of the invention further combines reflective surfaces, a blind mechanism, and a temperature sensitive mechanism for rotating the blind mechanism to create sub-roof adaptable insulators. A sub-roof adaptable insulator designed to underlie a sunlit roof is the third component of the invention. A sub-roof adaptable insulator designed to underlie a shaded roof is the fourth component of the system.

The passive solar shingles on the sunlit roof reflect high angle incident sunlight to the sky. The reflection of low angle sunlight at morning and evening is limited by shingle design to avoid blinding ground level observers. The sub-roof space may be an attic or living space. If the sub-roof space immediately below a sunlit roof heats above a pre-selected temperature, the sub-roof adaptable insulator for a sunlit roof closes to limit radiant and convective heat gains to the area between the roof and the adaptable insulator. The sub-roof adaptable insulator for a shaded roof opens to permit radiant and convective loss of heat energy through the shaded roof. The radiating shingles on the shaded roof facilitate radiant heat loss.

The passive solar shingles on the sunlit roof channel low angle incident sunlight to energy absorbing areas on the shingle, warming the shingle. The reflection of low angle sunlight at morning and evening is limited by shingle design to avoid blinding ground level observers. If the sub-roof space immediately below a sunlit roof cools below a pre-selected temperature, the sub-roof adaptable insulator for a sunlit roof closes to limit radiant and convective heat losses from the area below the adaptable insulator. Conversely, if the solar-heated shingles heat the sub-roof adaptable insulator sufficiently, then the insulator opens to allow heat exchange with the wider sub-roof area. The sub-roof adaptable insulator for a shaded roof closes to limit radiant and convective loss of heat energy through the shaded roof. This limits heat loss through the radiating shingles on the shaded roof. The radiating shingles may also be inefficient radiators at cold temperatures, further limiting heat loss.

It is a further object of the invention that the passive solar shingles and the sub-roof adaptable insulator may be employed independently of each other.

DESCRIPTION OF THE DRAWINGS

Further features of the present invention will become apparent to those skilled in the art to which the present invention relates from reading the following description with reference to the accompanying drawings, in which.

DESCRIPTION OF THE INVENTION

Figure 1:
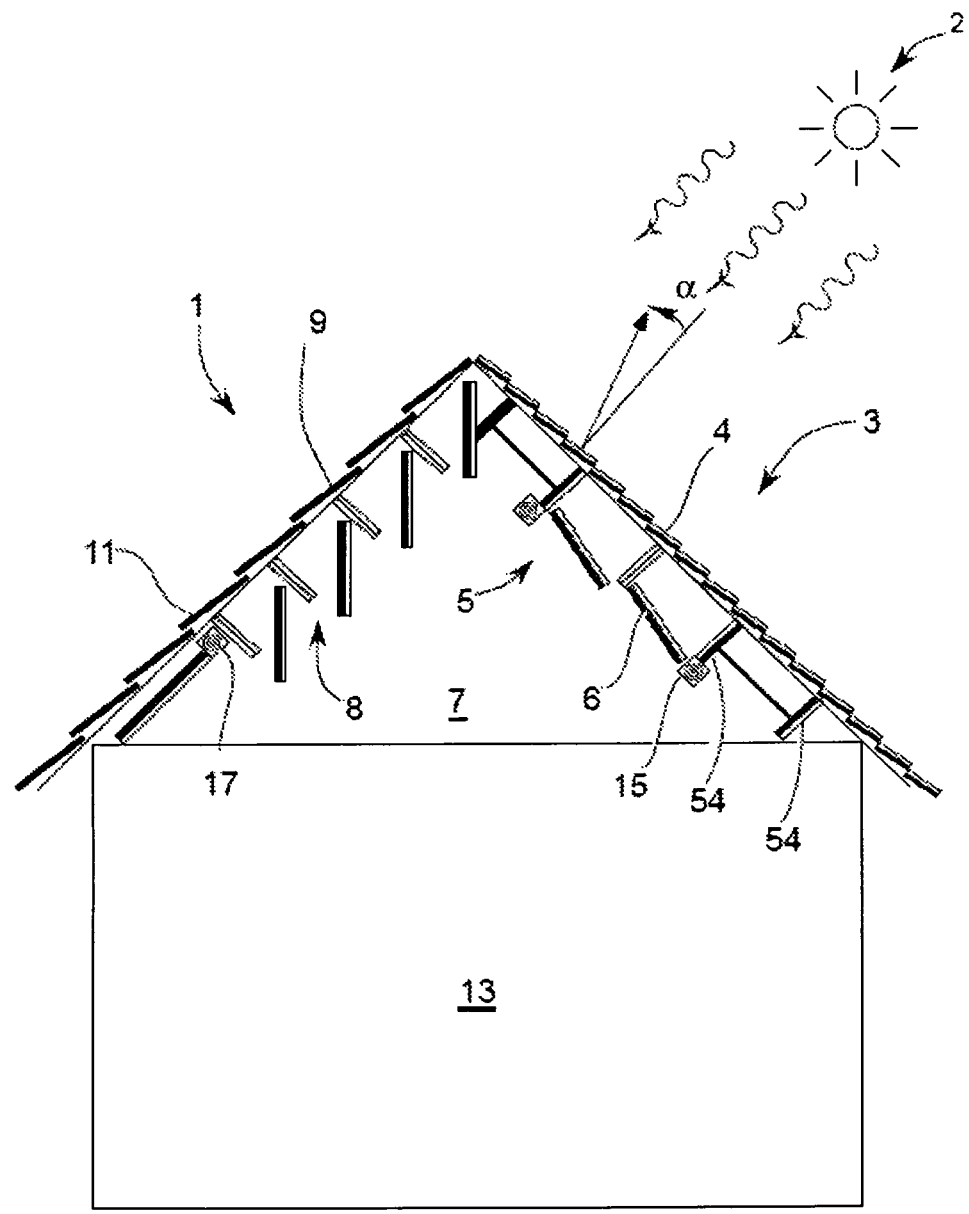
FIG. 1 illustrates a building equipped with four adaptive passive solar roof features, in configuration for summer sun.

The invention will now be described with reference to the drawing figures, in which like reference numerals refer to like parts throughout.

FIG. 1 illustrates a building 1 equipped with four adaptive passive solar roof features, in configuration for summer sun 2. First, sunlight reflects from the sunlit portion of the roof 3 due to reflective shingles 4. This reduces radiant heat gain significantly. Second, an adaptive insulating layer 5 is present under the sunlit roof 3. The adaptive insulating layer 5 orients panels, or blinds 6 so that a reflective surface generally faces the roof 4 and seals against fixed supports 54 or adjacent blinds 6 to form a nearly solid barrier, restricting convective heat exchange between the sunlit roof 4 and the attic space 7. In cold weather conditions, adaptive insulating layer 5 is operable to open blinds 6 to permit convective heat exchange between roof 3 and attic space 7. Third, a second adaptive insulating layer 8 is present under the shaded portion of the roof 9. This second adaptive insulating layer is similar in structure to adaptive insulating layer 5. In the configuration shown in FIG. 1, the second adaptive insulating layer 8 is open to permit convective and radiant heat transfer from the attic space 7 to the shaded roof 9. Temperature sensitive mechanisms 15 and 17 associated with insulating layers 5 and 8, respectively, and their associated blinds, are designed to have distinct behavior, with temperature sensitive mechanism 15 effecting insulating layer 5 to close and insulate the attic from the roof at high and low temperatures, while temperature sensitive mechanism 17 effects insulating layer 8 to close and insulate lower space 13 at cold temperatures. These different behaviors can be implemented by using different connections between identical temperature sensors and the blinds. Fourth, the shingles 11 on the shaded roof are non-reflective, and therefore absorb radiant heat from all directions, and emit radiant heat in all directions. These absorptive shingles never receive direct sunlight, so are never hot. The combined effect of avoiding radiant heat gain, insulating the interior of the building against the sunlit roof, allowing heat transfer from the attic to the shaded roof, and radiant heat loss from the shaded roof will substantially cool the attic space 7 and reduce heat transfer to the living space 13. Any subset of the four features will operate independently. Any subset of the system will operate with an elevated ceiling and no attic space.

Passive Solar Shingles

Figure 2:
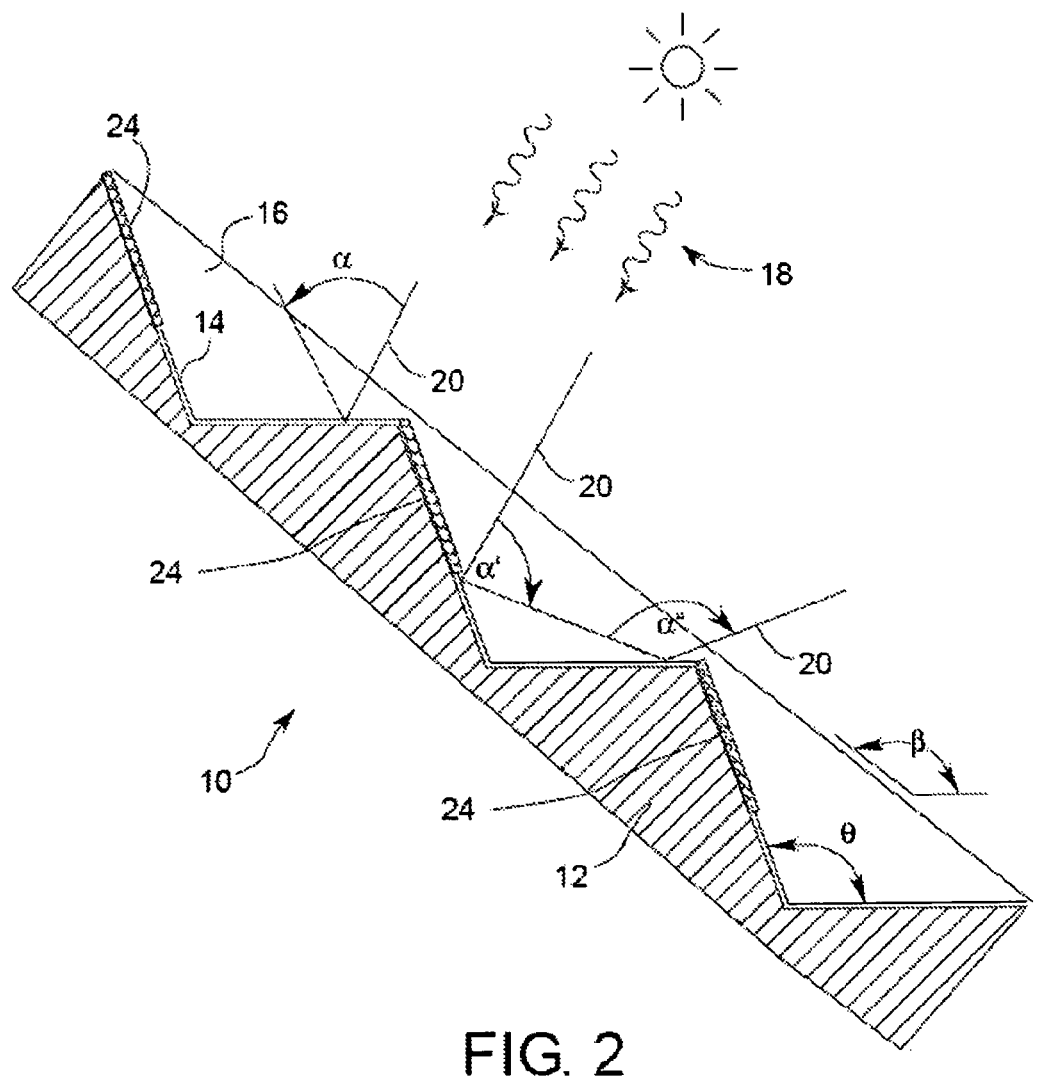
FIG. 2 is a schematic cross-sectional view of a passive solar shingle of the invention shown with the sun in high angle elevation as in summer.

One embodiment of the solar shingle 10 used in connection with the invention comprises three layers as shown in FIG. 2: a substrate layer 12 of material such as Styrofoam, wood, metal, stone or ceramic that forms the bottom of the shingle, a reflective layer 14, and a transparent protective layer 16. The preferred form would be similar in size to conventional shingles. In another embodiment, a shingle may be a large sheet, potentially covering an entire roof. In a further embodiment, the shingle may be formed in a large sheet which may be cut to size according to dimensions of the roof to which it is applied.

FIG. 2 illustrates a cross section of a passive solar shingle designed to reflect light up and maintain a traditional shingle appearance for an observer on the ground. Layering of these simple shingles in a conventional shingle pattern provides some passive solar effect. As shown in FIG. 2 sunlight 18 arrives at a high angle and sun rays 20 striking shingle 10 are reflected away from the roof. If the roof is relatively flat, the light is reflected upwards at local noon. The protective transparent layer 16 is made of a material such as glass, Teflon® or Tefzil®. Light 20 is reflected from reflective surfaces 14 through different angles (alpha, alpha') at different locations on the shingle. Light 20 reflected downward through angle alpha1 is reflected a second time through angle alpha", so that it leaves the shingle on an ascending trajectory. The reflective surface 14 is affixed to structural substrate 12. Non-reflective surfaces 24 are arranged to impart a color visible to an observer from the ground. If angle of installation beta and angle of trough theta are correctly matched, then an observer on the ground sees the color of the non-reflective material and never experiences glare from reflected light, while the majority of the shingle reflects sunlight back to the sky.

Figure 2A:
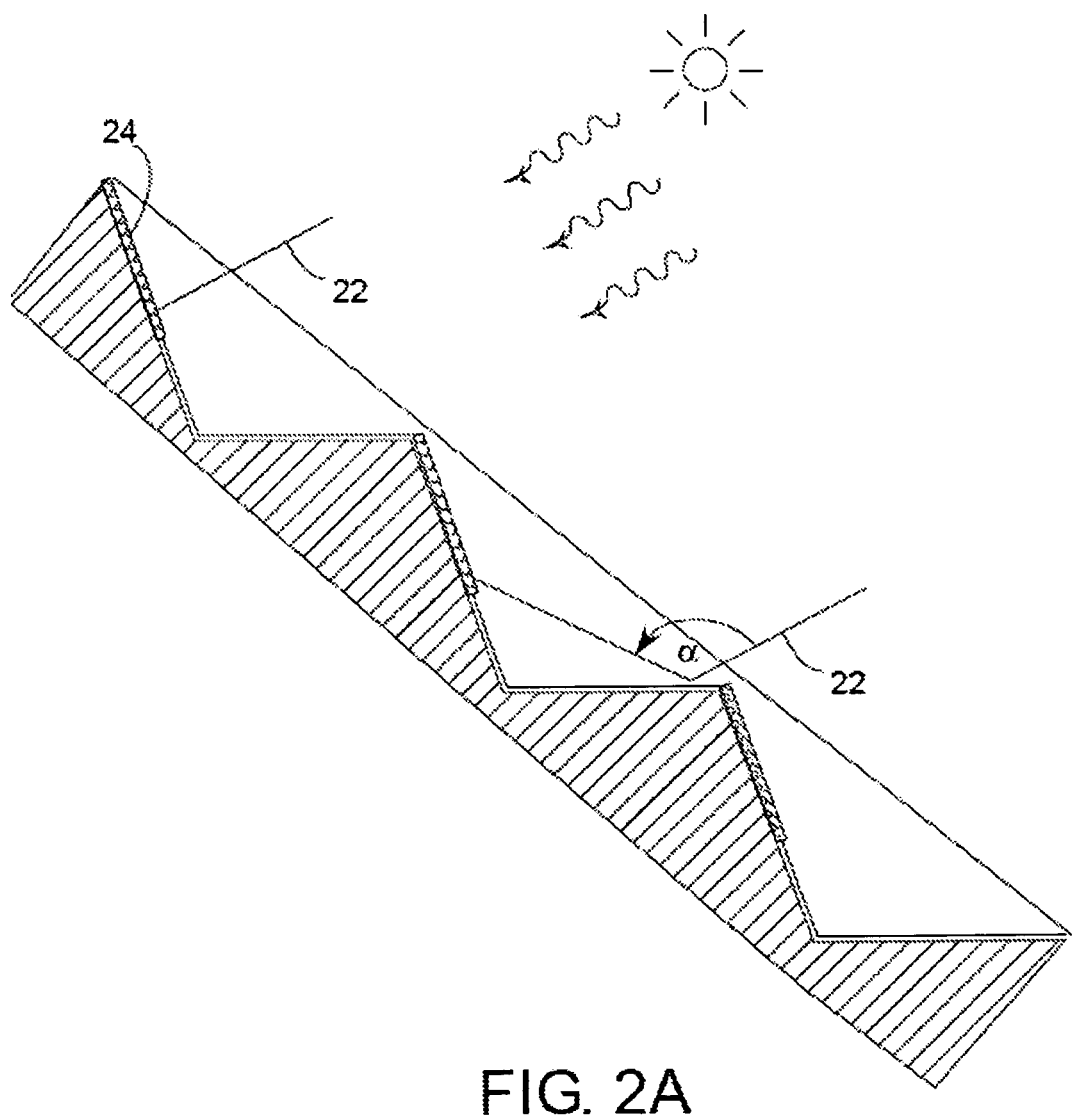
FIG. 2A is a schematic cross-sectional view of a passive solar shingle of the invention shown with the sun in low angle elevation as in winter.

In the winter sun, as shown in FIG. 2A, sun rays 22 arriving at a low angle strike non-reflective surfaces 24 of the shingle, which may absorb the light and gain heat energy. At this low solar angle, the light strikes the reflective surface less so that more radiant energy is available to heat the roof and the space below.

Because of the reflective properties of its configuration, the flat shingle design may have limited practical applications. A typical application is for heat rejection on nearly flat roofs in consistently (i.e., year-round) warm climates.

Flat shingle designs are not optimal where reflected sunlight may blind drivers, pilots, and other equipment operators. Flat shingle designs are also not optimal where heat absorption is desirable in season, such as in winter. Flat shingle designs on sloped roofs also will change the appearance of a conventional roof dramatically.

Figure 3:
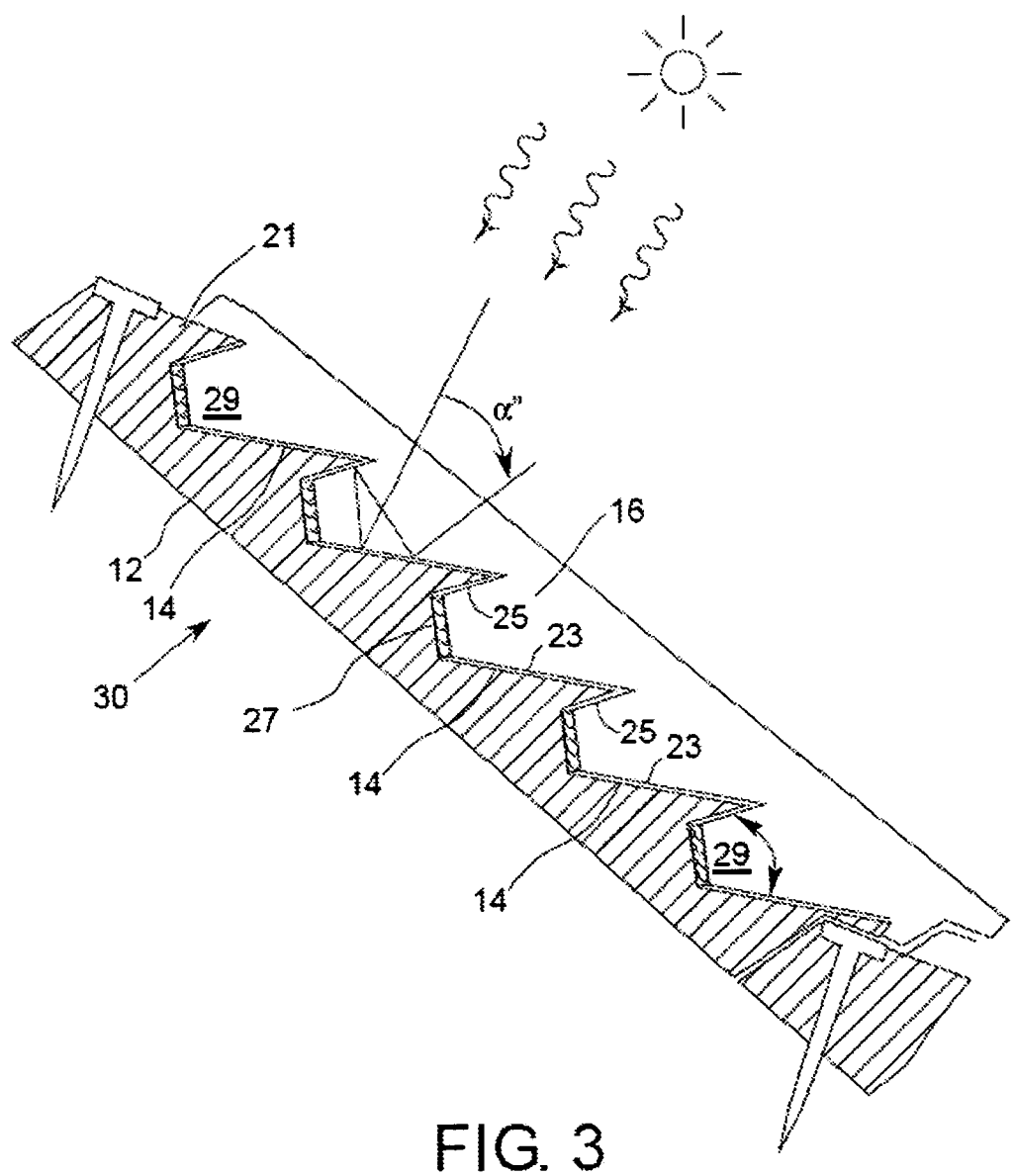
FIG. 3 is a schematic cross-sectional view of another embodiment of the passive solar shingle of the invention shown with the sun in high angle elevation as in summer.
Figure 3A:
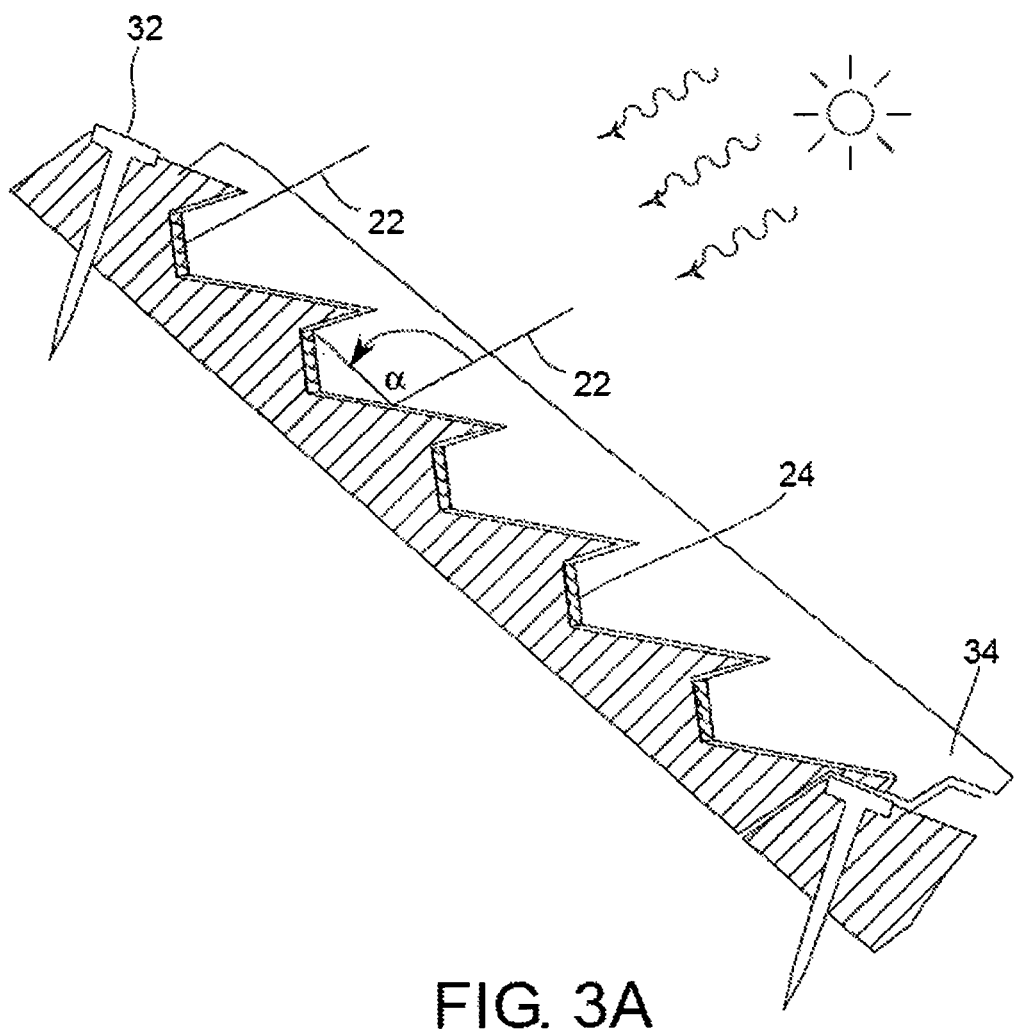
FIG. 3A is a schematic cross-sectional view of another embodiment of the passive solar shingle of the invention shown with the sun in low angle elevation as in winter.

More complex passive solar shingles apply familiar passive solar heating principles on an arbitrarily small scale. Overhanging reflective surfaces protect heat absorptive surfaces from summer sun while channeling winter sunlight onto the absorptive surface. Unlike a roof having a single overhang, a single shingle provide by the invention may have a repeating pattern of overlapping wedges 21 that are reflective on the topside 23 and underside 25. A small dark spacer 27 between wedges 21 absorbs light that reflects along the narrowing channel 29 formed by two adjacent wedges as seen in FIG. 3. In a preferred embodiment, the reflective surfaces 23 and 25 of the wedges may be comprised of a metallized plastic. The absorptive spacer 27 may be any absorptive material, such as plastic, carbon, metal, stone, glass, or wood. Nearly all sunlight striking the shingle at a high angle is reflected back to the sky after striking one or more reflective surfaces. A large fraction of sunlight striking the shingle at a low angle enters a reflective channel 29 and is absorbed by the dark spacer 27, heating the shingle as seen in FIG. 3A.

In another embodiment of a passive solar shingle, an absorptive surface may be placed so that the absorptive surface is visible from the ground while reflective surfaces are only visible from vantage points at and above the level of the roof. This design preserves the general appearance of the roof for observers on the ground. A shingle having the wave and trough design shown in FIGS. 2 and 2A can be configured to have reflective surfaces 14 oriented to receive sun rays 18 in seasonal times of high sun angle, such as the summer, and absorptive surfaces 24 oriented to receive sun rays 18 in seasonal times of low sun angle, such as the winter. In this regard, the installed shingles help to reflect the sun's rays in the summer to help cool the building, and receive the sun's rays through the absorptive surfaces from low sun angle to help warm the building in the winter. The precise depth of the waves and troughs of the shingle and the positional installation of the shingles on the roof may vary according to the pitch of the roof.

Small scale structure may be implemented to limit the angle of reflection of morning and evening sun. An exemplary embodiment comprises a series of reflective troughs. Another exemplary embodiment comprises a reflective grid overlying a flat reflective surface.

Small scale structures to implement passive solar features may be combined with structures that limit angles of reflection.

Reflected sunlight might promote undesirable chemical reactions in the atmosphere, depending on local pollutants. An exemplary problem is a set of reactions between volatile organic compounds, also call VOC, produced by many trees and notably by oak trees, which undergo complex reactions when mixed with automobile exhaust in sunlight. Very specific wavelengths of light facilitate such reactions. A passive solar shingle reflecting said wavelengths of light through air containing automobile exhaust and VOC risks doubling the rate of generation of pollutants. The problem may be addressed by absorbing these specific wavelengths of light in the protective coating of the passive solar shingle.

The clear polymer coating prevents the metallized reflective surfaces from acting as electrical conductors, and impedes fire. Due to the possibility of noxious fumes emanating from the protective coating of a passive solar shingle in the event of a fire, the shingle may be fastened with a mechanism that spontaneously detaches before the melting point of the protective coating is exceeded. On a sloped roof, a detached shingle may slide down the roof to the ground.

Figure 8:
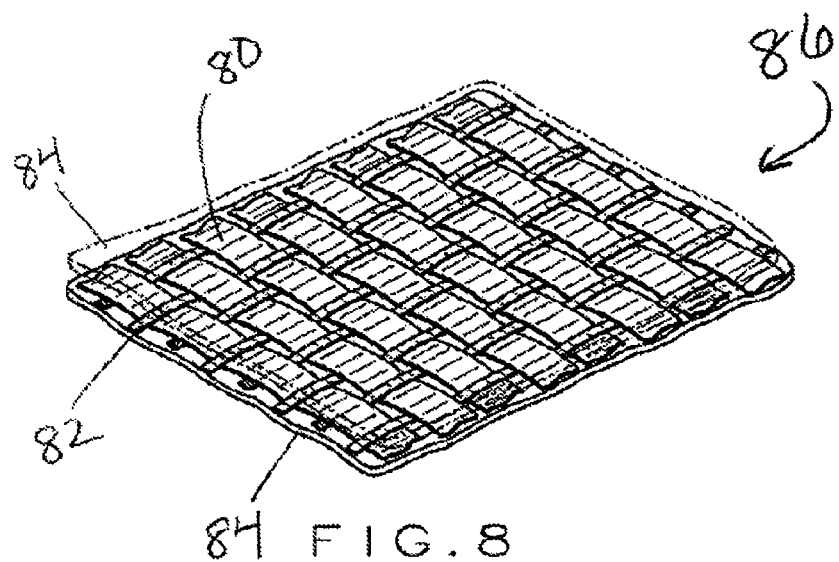
FIG. 8 is a schematic view of an embodiment for securing a metallized sheet between thermoplastic layers.

Metallized plastic sheets do not adhere well to thermoplastics when annealed in conventional layers. One or more metallized plastic strips 80 interwoven with perpendicularly oriented strips 82 of conventional thermoplastics, then placed between solid top and bottom layers of thermoplastic 84, will adhere to form a solid multilayer sheet 86 when heat sealed as shown in FIG. 8. The thermoplastic weave adheres to the thermoplastic top and bottom layers while trapping reflective metallized plastic strips in place. The shape of the strands in the woven thermoplastic layer determines the small scale shape of the reflective surface. The top and bottom thermoplastic layers protect the metallized plastic from weathering, and provide adherence to any further layers.

Figure 9:
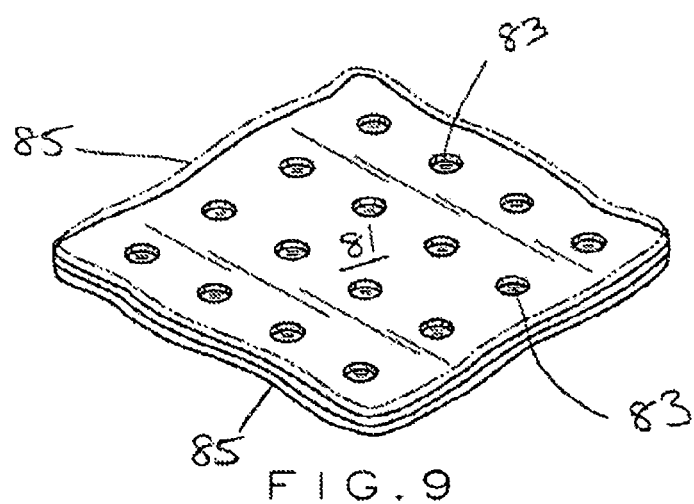
FIG. 9 is a schematic view of another embodiment for securing a metallized sheet between thermoplastic layers.

A sheet of metallized plastic 81 having a series of perforations 83 will allow surrounding thermoplastic layers 85 to adhere together through said perforations as shown in FIG. 9. A single perforated metallized plastic sheet can be forced into complex shapes by weaving it around appropriately shaped thermoplastic strips. In an exemplary embodiment, a perforated sheet of metallized Mylar® is woven between ethyl vinyl acetate (EVA) strips having interlocking right triangular cross section, and placed between top and bottom EVA sheets. Top and bottom layers of Teflon® will heat anneal to the corresponding EVA layers to form flexible thin sheet of reflective material with a limited range of reflection angles.

FIG. 3 illustrates a cross section of another passive solar shingle 30 designed to reflect summer sunlight and absorb winter sunlight. Sunlight 18 strikes shingle 30. A protective transparent layer 16 is made of a material such as glass, Teflon® or Tefzil®. Light coming from a high angle, such as from summer sun, is reflected from reflective surfaces 14 into other reflective surfaces of the shingle, is reflected multiple times and ultimately leaves the shingle at angle alpha" to the incident beam, again on an ascending trajectory. The reflective surface 14 is affixed to a structural substrate 12. In the winter sun, the light will arrive at a low angle and reflect off converging reflective surfaces to reach non-reflective surfaces 24 as shown in FIG. 3A. If the angle of installation and angle of convergent reflective surfaces are correctly matched, then the shingle will absorb nearly all winter sunlight and reflect nearly all summer sunlight back to the sky. The shingle may have an edge suitable for fastening with traditional hardware 32. The shingle may be designed to abut rather than overhang a shingle on a lower row. An abutting shingle may have a lip 34 to prevent water from seeping between shingles. The fastener 32 may be designed to melt and fail, allowing the shingle to slide over the roof to the ground, if a burning shingle presents a risk in a building fire (Although extremely stable at low temperatures, Teflon and Tefzil do pose a risk of producing hazardous vapors if burned).

Figure 4:
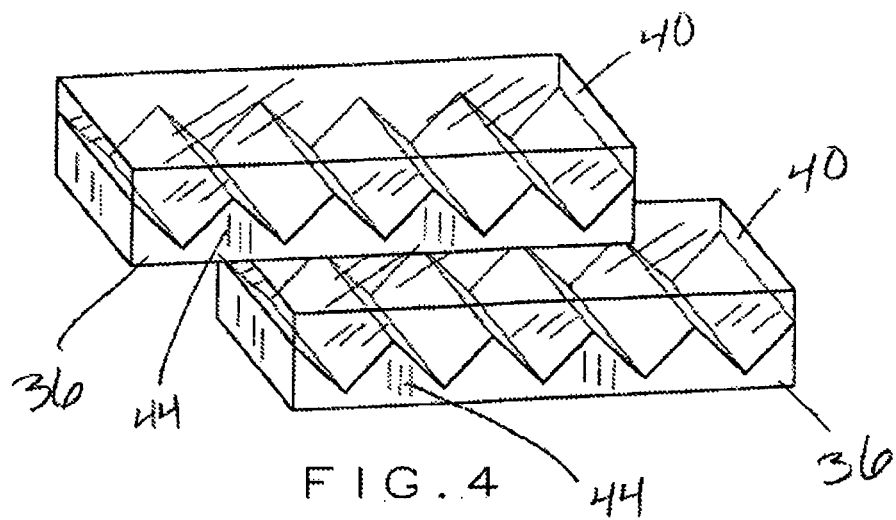
FIG. 4 is a schematic view of overlapping shingles.

FIG. 4 illustrates a perspective view of overlapping shingles 36 each comprising a clear protective layer 40, a pleated pattern reflective surface 42, and a structural backing 44. Two overlapping shingles are shown in FIG. 4. It is understood that a plurality of shingles can be arranged over the entire roof in this fashion. The pleated arrangement of the reflective surface limits the angles of reflection from overhead sun, so that reflection detected by an observer to the side of the shingles diminishes rapidly as the observer approaches a plane horizontal with the shingles. An overlapping shingle may create an overhang with passive solar effects comparable to the effects achieved by the fine structure of the shingle in FIG. 3.

Radiating Shingles

Shingles for a shaded surface may be conventional dark shingles, including asphalt, wood, and slate, shingles, and metal sheets. These materials absorb and radiate but do not reflect. Because the shingles are placed only on perpetually shaded areas of a roof, incident solar radiation never heats the shingles. The shingles continuously exchange radiant energy with the sky, which is cool except during warm periods with cloud cover. The shingles may be coated or constructed of a material that limits emissivity at low temperatures. USPTO Patent Application 20080057204, "Tunable variable emissivity materials and methods for controlling the temperature of spacecraft using tunable variable emissivity materials", describes exemplary temperature sensitive variable emissivity materials and coatings, and relevant production methods. Electrochromic devices are another exemplary variable emissivity technology. Electrochromic devices require active electronic temperature monitoring and apply variable voltage to a material to alter emissivity or transmissivity. In an exemplary embodiment, a radiating shingle would have high emissivity at temperatures above 30 degrees Centigrade, and low emissivity at temperatures below 10 degrees Centigrade.

Sub-Roof Adaptable Insulator

A sub-roof adaptable insulator facilitates and impedes radiant and convective energy transfer between spaces separated by the insulator in response to ambient temperature. In general, said spaces comprise a lower space that is a living area or is separated from a living area by a fixed insulating barrier, and a higher space that is adjacent to the roof. In an exemplary implementation, the adaptable barrier divides an attic space into lower and higher spaces. An adaptable insulator comprises at least one temperature sensor, at least one movable barrier, at least one power source and mechanism for shifting the configuration of said barrier, and optional physical screens to protect the barrier. The barrier is capable of shifting through at least one closed configuration and at least one open configuration in response to the temperature sensor and powered mechanism. The range of motion of the barrier typically is limited to an extreme cold and an extreme warm position. The range of temperatures that cause the barrier to shift to an open configuration may be called an opening temperature range. An adaptable insulator has at least one opening temperature range.

Figure 5:
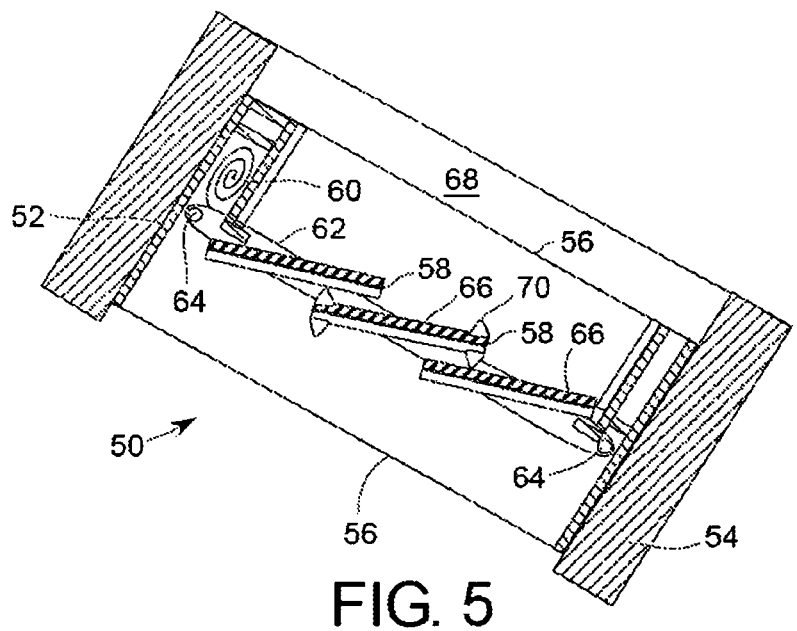
FIG. 5 is a schematic cross-sectional view of an adaptable insulator assembly designed for placement under the side of the roof facing seasonal sunlight as shown in FIG. 1.
Figure 6:
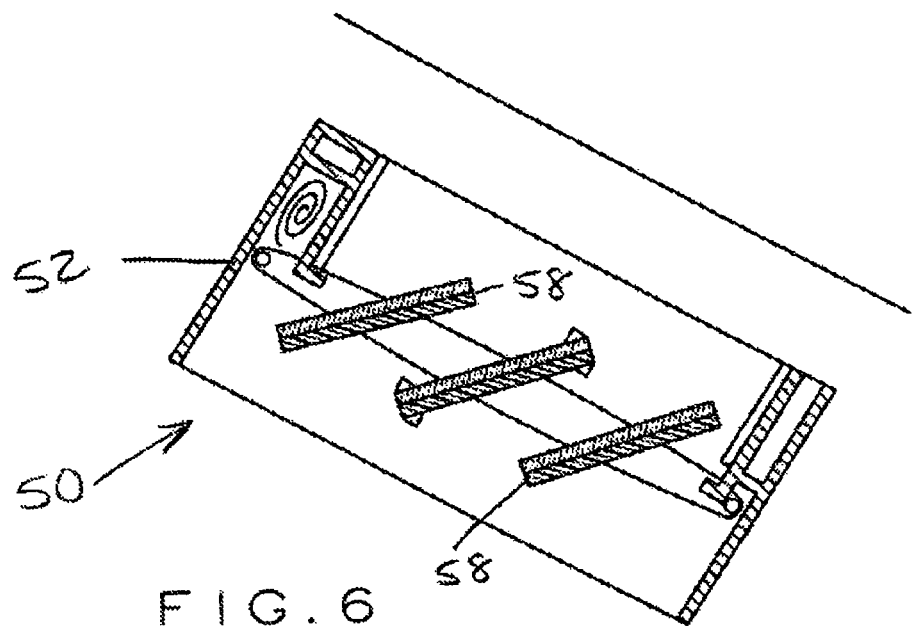
FIG. 6 is a view similar to FIG. 5 with the adaptable insulator assembly in an open configuration.

FIG. 5 illustrates a cross section view of an attic barrier module 50 designed for placement under the sunlit side of a roof such as shown in FIG. 1. In a typical retrofitting design, the module's solid outer housing 52 fits closely between roof joists 54 and abuts adjacent modules. Non-solid module faces 56 (which can be screens) protect the blinds 58 from damage. A temperature sensitive mechanism 60, such as a bimetallic strip or electromechanical device, pulls a cord or chain 62 a short distance around pulleys 64 to orient blinds 58 so that a reflective surface 66 generally faces the attic space 68 and seals against adjacent blinds to form a nearly solid barrier. In this configuration, radiant energy coming through the roof is reflected away from the interior space. Soft foam ridges 70 may be used to facilitate sealing of the space between adjacent blinds in the cold configuration. This structural configuration is also appropriate for the attic under a shaded roof as shown in FIG. 1. In FIG. 6, attic barrier module 50 is in a configuration for permitting radiant energy from sunlight striking the roof to pass through to the interior space, i.e., the attic. In this configuration, the temperature sensitive mechanism 60 acts in response to a predetermined temperature condition, such as a cool temperature in the interior space, and causes the blinds 58 to open allowing the radiant energy to pass through.

Figure 7:
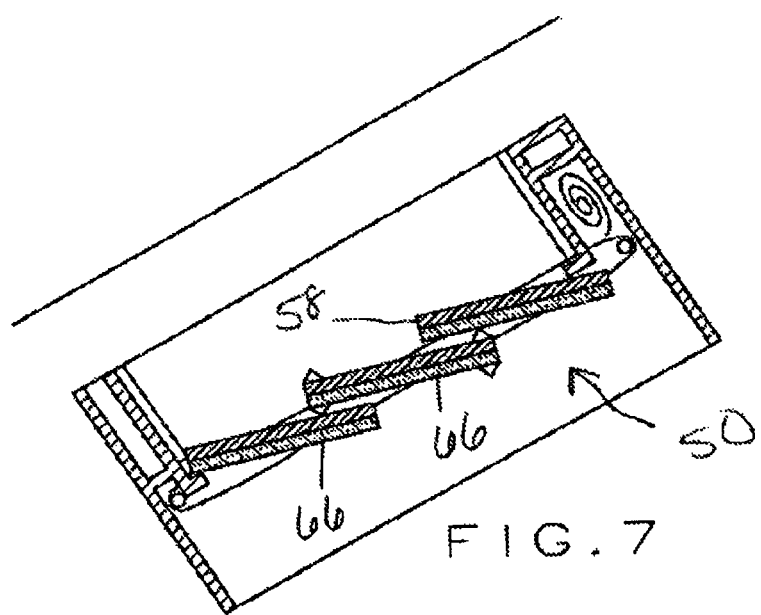
FIG. 7 is a schematic cross-sectional view of an adaptable insulator assembly designed for placement under the side of the roof facing away from seasonal sunlight as shown in FIG. 1.

In cold temperature conditions, such as winter, where it is desirable to prevent loss of heat from the living space through the roof, attic barrier module 50 may be configured to orient blinds 58 to position the reflective surface 66 to the living space to reflect radiant heat energy back down to the living space and prevent heat loss through the roof, as shown in FIG. 7.

In a preferred embodiment, the temperature sensor and power source are combined in a thermo-mechanical device such as a bimetallic strip. A bimetallic strip is often implemented as a coil that expands in heat and contracts in cold. When one end of the coil is fixed and the other free, the free end circumscribes an arc. Various well-known controls may be attached to a bimetallic strip to convert the movement of the strip to rotation of a pointer, linear displacement of an adjacent surface, or to control an electronic switch. Any of these methods may be applied to control a barrier configuration. Another thermo-mechanical alternative is an expandable, sealed gas container, where the volume of the container increases and decreases with temperature according to the formula of Boyles' Law, $PV=nRT$, where P is pressure, V is volume, n is a quantity of ideal gas, R is a constant, and T is temperature. If pressure is held constant, then the product of volume and temperature is also constant. A piston in a sealed gas cylinder can produce linear motion of a control. One embodiment of this device exposes a cylinder to incident sunlight, causing the cylinder to heat and cool with solar radiation. Such a cylinder may have an absorptive coating to increase heat gain and loss with the rising and setting of the sun, respectively. In another embodiment, a thermo-mechanical device may directly change the orientation of an affixed barrier. In this instance, a bimetallic strip or sealed gas container is attached directly to a barrier, and changes the orientation of said barrier to adjacent structures to effect opening and closing of the adaptable insulator. Another embodiment employs an electronic temperature sensor and electromechanical device, such as an electric motor or solenoid, to shift the barrier configuration. A preferred embodiment of the barrier is a module of fixed axis blinds held in place by a frame that fits between joists of a roof. Each blind rotates 180 degrees or less around its fixed axis, and is reflective on at least one side. The mechanism that shifts the barrier configuration of a blind may be a cable running through the blinds. The power source pulls the cable a short distance as the temperature varies from warm to cold, thereby opening and closing the blinds. One alternative embodiment of the barrier is a pair of insulating sheets each having an alternating series of large rectangular holes and reflective, insulated surfaces. A temperature sensitive mechanism slides at least one sheet so that at selected temperatures the holes in each sheet are blocked by the surfaces in the other. At other temperatures the holes overlap, allowing radiant and convective heat exchange through the holes.

While an adaptable insulator may comprise a single barrier that shifts from a cold extreme configuration to a warm extreme configuration, many temperature control scenarios require more complex behavior. For instance, it often will be desirable to detect the temperature of a lower space, below the adaptable insulator, and the temperature of a higher space, above the adaptable insulator, to determine whether to facilitate energy transfers between the lower and higher spaces. Desirable energy transfers typically shift the temperature of the lower space toward a comfortable temperature, such as 22 degrees centigrade. For instance, if the higher and lower spaces are equally cold then the insulator should impede heat transfers to retain any heat generated in the lower space. However, if the lower space is cold and the upper space is warm, the barrier should open to permit radiant heat gain in the lower space. If the lower space is comfortable and the upper space is either hot or cold, the insulator should close to impede heat gain and loss, respectively. If the lower space is hot and the upper space is cold, the insulator should open to facilitate radiant and convective heat loss from the lower space. In these situations the previously defined opening temperature range refers to a plurality of temperature inputs that in combination cause the insulator to open.

Figure 14:
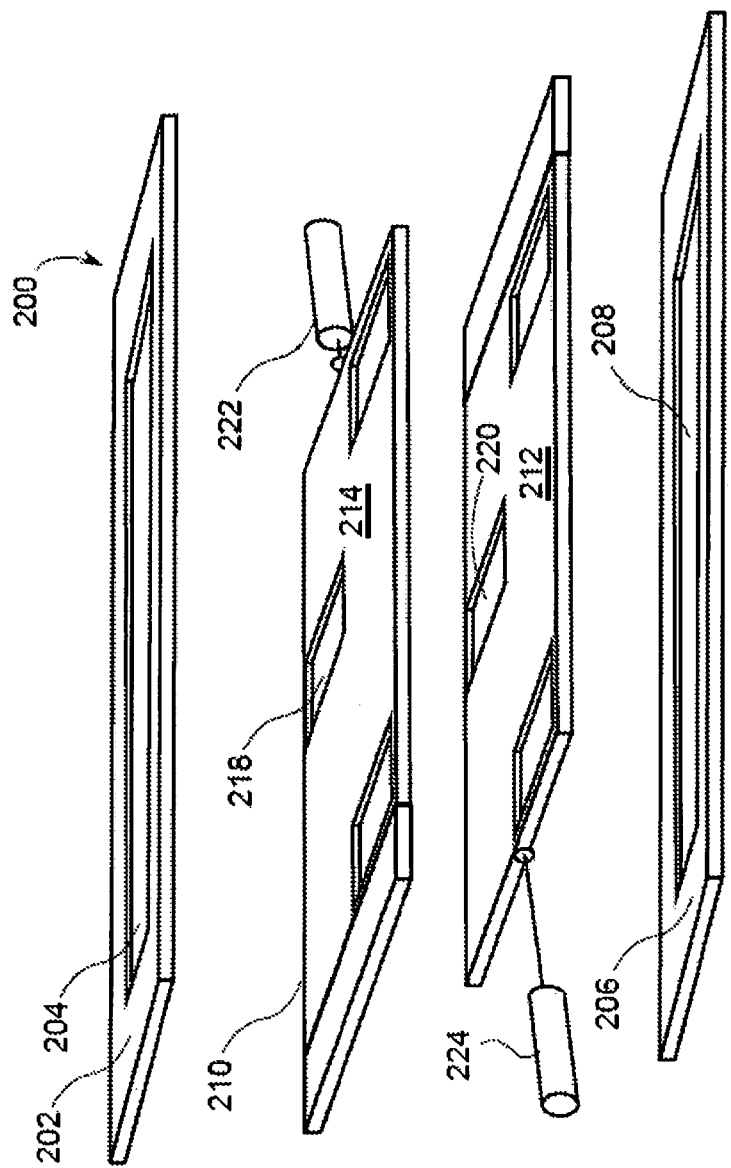
FIG. 14 is an exploded schematic view of another embodiment of the adaptive insulator of the invention.

A plurality of adaptable insulators can be configured to detect different temperatures and effect different barrier positions. One embodiment comprises a sliding insulator assembly as shown in an exploded view in FIG. 14. The sliding insulator assembly 200 comprises an upper frame 202 having an opening 204, and a lower frame 206 having an opening 208. Insulator assembly 200 is adapted to be positioned underneath a roof with upper frame 202 disposed towards the roof and lower frame 206 disposed towards the living area in the building. Frames 202 and 206 have sandwiched between them sliding insulator panels 210 and 212. The upper surface 214 of insulator panel 210 may be comprised of reflective material. Insulator panel 210 has one or more windows 218 and insulator panel 212 has a similar disposition of windows 220. A temperature sensor and actuator 222 are operatively connected to insulator panel 210 to move the panel when a predetermined temperature in the space above the insulator assembly is reached. The temperature sensor and actuator can be any mechanical or electromechanical device discussed elsewhere in the specification. The temperature sensor and actuator can be calibrated so that insulator panel 210 is pushed or withdrawn a certain distance in response to the particular temperature in the above space. For example, at hot temperatures the insulator panel would be pushed to the left as shown in FIG. 14. Similarly, a temperature sensor and actuator 224 are operatively connected to insulator panel 212 to move the panel when a predetermined temperature in the space below the insulator assembly is reached. The temperature sensor and actuator can be calibrated so that insulator panel 212 is pushed or withdrawn a certain distance in response to the particular temperature in the below space. For example, at hot temperatures in the lower space the insulator panel would be pushed to the right as shown in FIG. 14. When windows 218 of insulator panel 210 are in alignment with the windows 220 of insulator panel 212, heat transfer is permitted through insulator assembly 200. When windows 218 of insulator panel 210 are out of alignment with the windows 220 of insulator panel 212, heat transfer through insulator assembly 200 is impeded.

The temperature sensor/actuators work in opposite directions on insulator panels 210 and 212. When the temperature representing the space above insulator assembly 200 is "hot" and the temperature representing the space below insulator assembly 200 is "cold", insulator panels 210 and 212 move towards the same end of the framework. That orientation brings windows 218 and 220 into alignment, permitting heat transfer to occur through the aligned windows. If the respective temperatures in the spaces above and below insulator assembly 200 are not at different temperature extremes, windows 218 and 220 do not come into alignment and insulator assembly 200 will be closed. If the temperature of at least one of the above and below spaces is tightly constrained, then the insulator panel associated with that space can be fixed in place, and the other insulator panel can be implemented to adapt to heating and cooling.

Figure 10:
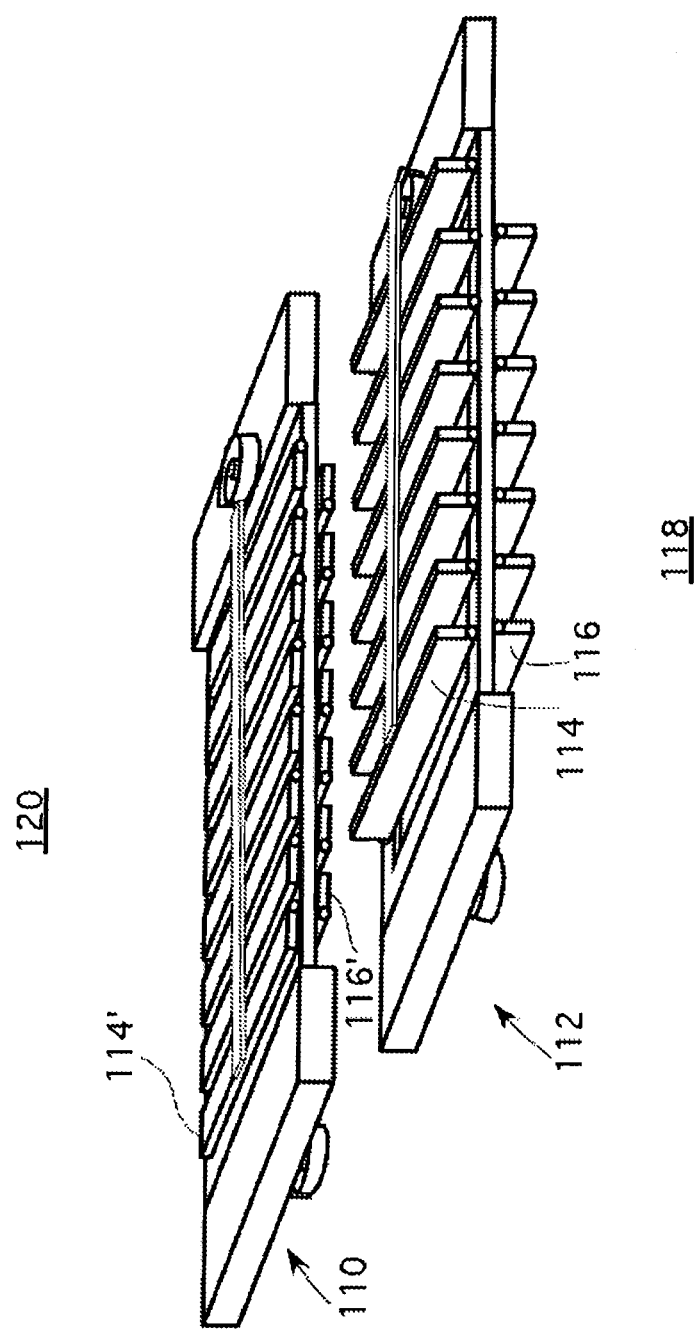
FIG. 10 is a schematic view of an adaptive insulator of the invention.

Another embodiment of a plurality of adaptable insulators comprises a pair of insulator assemblies 110 and 112 as shown in FIG. 10. The heat gain/heat loss assemblies may be placed adjacently each other and may be installed in a lateral array below the surface of the roof. Each insulator assembly comprises an upper insulator gate 114 and a lower insulator gate 116. The upper insulator gate 114 in each insulator assembly adapts and reacts to the temperature in the space 120 above it (or exterior to it), specifically the area just underneath the roof. The lower insulator gate 116 in each insulator assembly adapts and reacts to the temperature in the space 118 below it (or towards the interior of the building). Insulator assembly 110 facilitates heat gain in, or distribution to, the lower space 118 representing, for example, the attic or living quarters below, while insulator assembly 112 manages heat loss, or distribution, from the lower space 118 to the upper space 120. The upper insulator gate 114' in the heat gain insulator assembly 110 opens when the upper space 120 temperature is "hot". A "hot" temperature value by which the heat gain insulator assembly 110 becomes operative can be predetermined and programmed for applicability to the environment or desired conditions. The lower insulator gate 116' in the heat gain insulator assembly 110 opens when the lower space 118 temperature is "cold". Similarly, a "cold" temperature value can be predetermined and programmed for applicability to the environment or desired conditions. At least one of the insulator gates 114' or 116' in the heat gain insulator assembly 110 is therefore closed when either the upper space 120 is cold or the lower space 118 is comfortable or hot so that heat from upper space 120 is impeded from passing through to lower space 118. Similarly, the upper insulator gate 114 in the heat loss insulator assembly 112 opens when the upper space 120 temperature is cold. The lower insulator gate 116 in the heat loss insulator assembly 112 opens when the lower space 118 temperature is hot. At least one of the insulator gates 114 or 116 in the heat loss insulator assembly 112 is therefore closed when either the upper space 120 is hot or the lower space 118 is comfortable or cold. This condition impedes heat loss from lower space 118 to upper space 120 in cold weather conditions.

Figure 11:
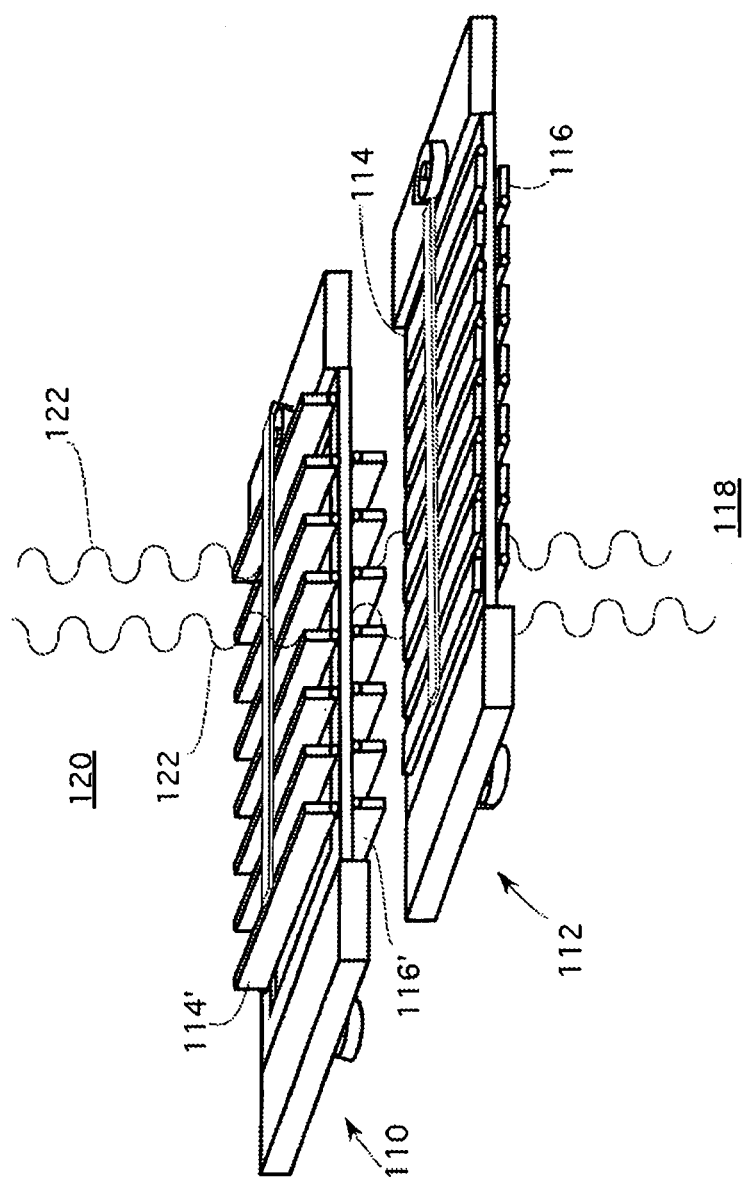
FIG. 11 is a schematic view of the adaptive insulator shown in FIG. 10 in a configuration to permit radiant heat to be transferred from a higher to a lower space.

The heat gain/heat loss assemblies 110 and 112 therefore help adjust and control temperature in the living space of the building. FIG. 11 shows the orientation of the respective insulator gate pairs of the heat gain/heat loss assemblies in a condition where the lower space 118 is cold and the upper space 120 is sufficiently warm to contribute radiant heat to the lower space 118, such as on a sunny, but cold day. In this orientation, both upper insulator gate 114' and lower insulator gate 116' of heat gain assembly 110 are open to permit convection of heat radiation 122 to travel from upper space 120 through heat gain assembly 110 to lower space 118. Under these conditions, heat loss assembly 112 does not contribute and both upper insulator gate 114 and lower insulator gate 116 remain closed.

Figure 12:
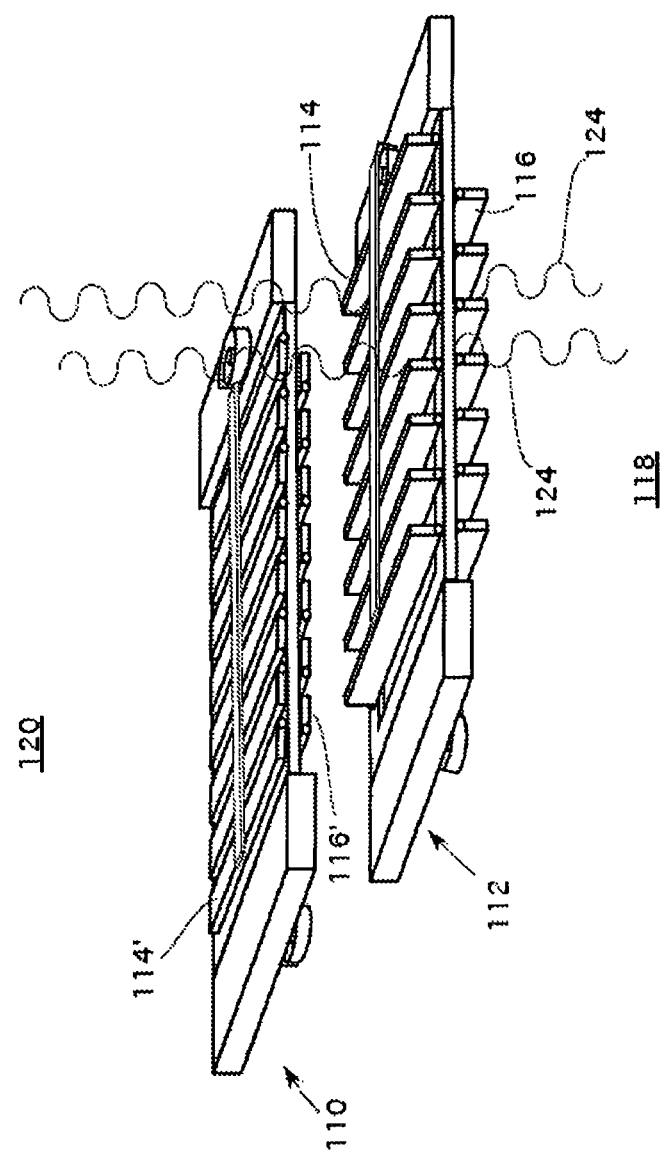
FIG. 12 is a schematic view of the adaptive insulator shown in FIG. 10 in a configuration to permit radiant heat to be transferred from a lower to a higher space.

FIG. 12 shows the orientation of the respective insulator gate pairs of the heat gain/heat loss assemblies in a condition where the lower space 118 is hot and the upper space 120 is relatively cool to distribute heat from the lower space 118, such as at night after a hot summer day. In this orientation, both upper insulator gate 114 and lower insulator gate 116 of heat loss assembly 112 are open to permit convection of heat radiation 124 to travel from lower space 118 through heat loss assembly 112 to upper space 120. Under these conditions, heat gain assembly 110 does not contribute and both upper insulator gate 114' and lower insulator gate 116' remain closed.

Figure 13:
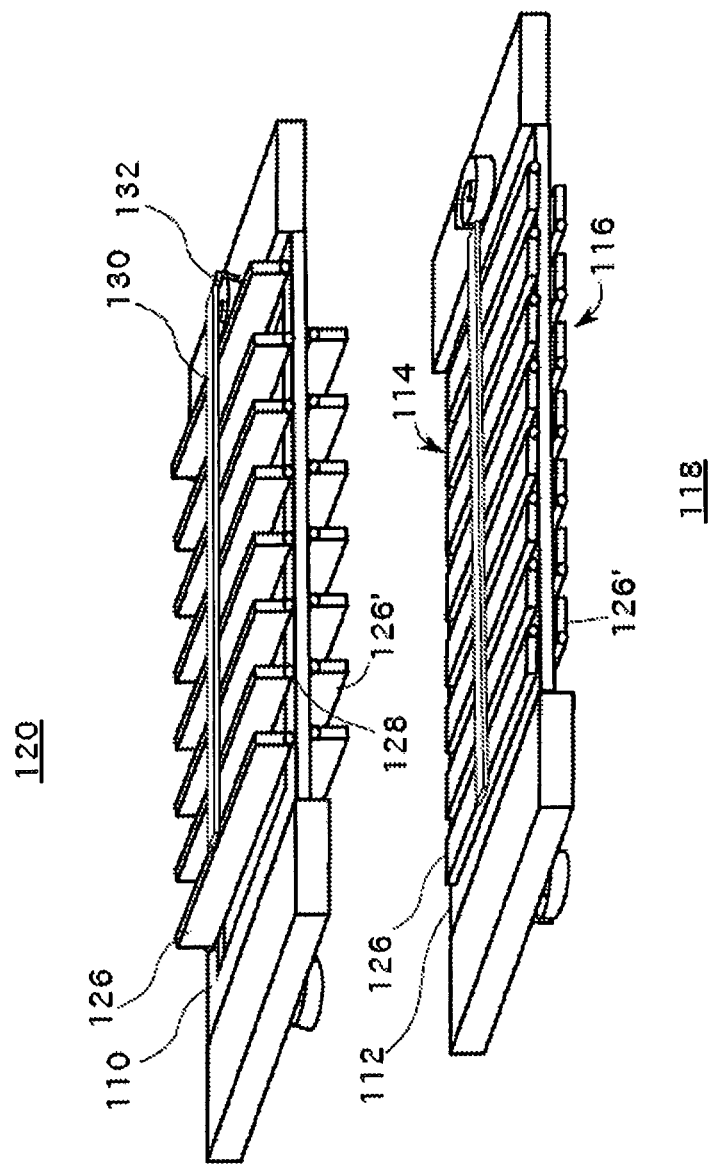
FIG. 13 is a schematic view of the adaptive insulator shown in FIG. 10.

FIG. 13 shows the operative details of the heat gain/heat loss assemblies 110 and 112. Each insulator gate comprises a plurality of blinds 126 which may be composed of practically any solid material, including glass. A preferred embodiment uses metalized plastic, optionally enclosed in a protective composite material as obtained by a heat-sealed weave of metallized Mylar® with ethyl vinyl acetate. Each blind 126 is pivotable, for example, about an axis 128. A connector 130, such as a solid bar or fabric strip, links all of the blinds 126 associated with a particular insulator gate to a heat-sensing driver 132. Each insulator gate has an associated set of blinds and heat-sensing driver. The heat-sensing driver 132 is adapted to synchronously move the blinds 126 in effecting opening and closing of the insulator gate. The heat-sensing driver may comprise a bimetallic strip, gas-filled piston, electric motor, solenoid, or any other mechanism for effecting physical movement in response to a signal. Any electronic temperature sensor, such as a thermocouple, would control electric power to an electric motor and solenoid. The heat-sensing driver 132 is operatively connected to connector 130 to move blinds 126 to effect opening or closing of the associated insulator gate. For example, the insulator gate can be manipulated to open when the temperature of the space to which it is associated is hot, and conversely, to close when the temperature of the space to which it is associated is cold.

Heat gain assembly 110 distributes collected heat in upper space 120 for distribution to lower space 118, while heat loss assembly 112 dissipates heat from lower space 118 to upper space 120. Typically only one of the heat gain/heat loss assemblies is open at any given temperature. Blinds 126 in insulator gate 114' of heat gain assembly 110 are open when the higher space is hot, and blinds 126' of insulator gate 116' are open when the lower space is cool. This permits radiant heat exchange and potentially circulation of air currents with additional heat exchange from higher space 120 to the lower space 118, thereby collecting heat as shown in FIG. 11. The blinds 126 and 126' of insulator gates 114' and 116', respectively, are closed if higher space 120 is cool or lower space 118 is hot, or both, as shown in FIG. 12.

Heat loss assembly 112 works conversely, opening blinds 126 of insulator gate 114 when upper space 120 is cool, and opening blinds 126' of insulator gate 116 when lower space 118 is hot. When the blinds of both insulator gates 114 and 116 open, heat loss assembly 112 facilitates convective and radiant heat loss from lower space 118 to upper space 120 as shown in FIG. 12. When either of heat gain assembly 110 or heat loss assembly 112 are closed, they insulate lower space 118 from upper space 120.

Another embodiment of a complex adaptable insulator comprises at least one higher disk-shaped barrier, an optional fixed barrier, and at least one lower disk-shaped barrier. Each disk shaped barrier may be directly linked to a temperature sensor and power source such as a bimetallic strip. The higher disk shaped barrier is linked to a temperature sensor in the higher space, and the lower disk shaped barrier is linked to a temperature sensor in the lower space. Each disk rotates through a partial arc in response to the temperature measured in the corresponding space. The higher disk and lower disks may rotate through arcs that differ in position and distance. It is helpful to think of the rotation in terms of an arbitrarily placed pointer on each disk that moves through clock positions that correspond to temperatures. In a representative embodiment, the lower disk could rotate 30 degrees so that the corresponding pointer passes through an arc from a 2 o'clock to 3 o'clock position, while the higher disk could rotate 150 degrees from the 12 o'clock to the 5 o'clock positions. One endpoint of the lower disk arc corresponds to a temperature where the inner space is too cool, and the other end of the arc corresponds to a temperature where the inner space is too warm. The endpoints of the higher disk arc correspond to temperatures where the higher space can add heat to or remove heat from the lower space. At least one surface, typically the lower surface, of each higher disk is directly apposed to at least one surface, typically the higher surface, of the lower disk. In a preferred embodiment, a single higher disk lies just above a fixed barrier, which lies just above a single lower disk. Each disk and the optional barrier are perforated in a carefully selected pattern such that perforations align when the lower space reaches a temperature extreme opposite of the higher space temperature. In one embodiment that extends the example given in this paragraph, multiple fixed barrier perforations span 15-degree arcs. Each perforation is separated from adjacent perforations by at least a 15-degree arc of intact barrier. The perforations in the lower barrier similarly span 15-degree arcs. At least one of the lower barrier perforations fully aligns with at least one fixed barrier perforation when the lower disk rotates to the 3 o'clock position. At least one of the lower barrier perforations fully aligns with at least one fixed barrier perforation when the lower disk rotates to the 2 o'clock position. Rotation to the 2:30 position causes complete misalignment, so that the barrier is closed regardless of the position of the higher barrier. The higher barrier rotates such that its perforations overlap the aligned fixed and lower barrier perforations when the lower barrier is in the 2 o'clock or 3 o'clock positions. In one embodiment, one half of the lower barrier adapts to cold temperatures, the other half of the lower barrier adapts to hot temperatures, and the higher barrier comprises a large wedge-shaped perforation that rotates in the opposite direction from the lower barrier.

Figure 15:
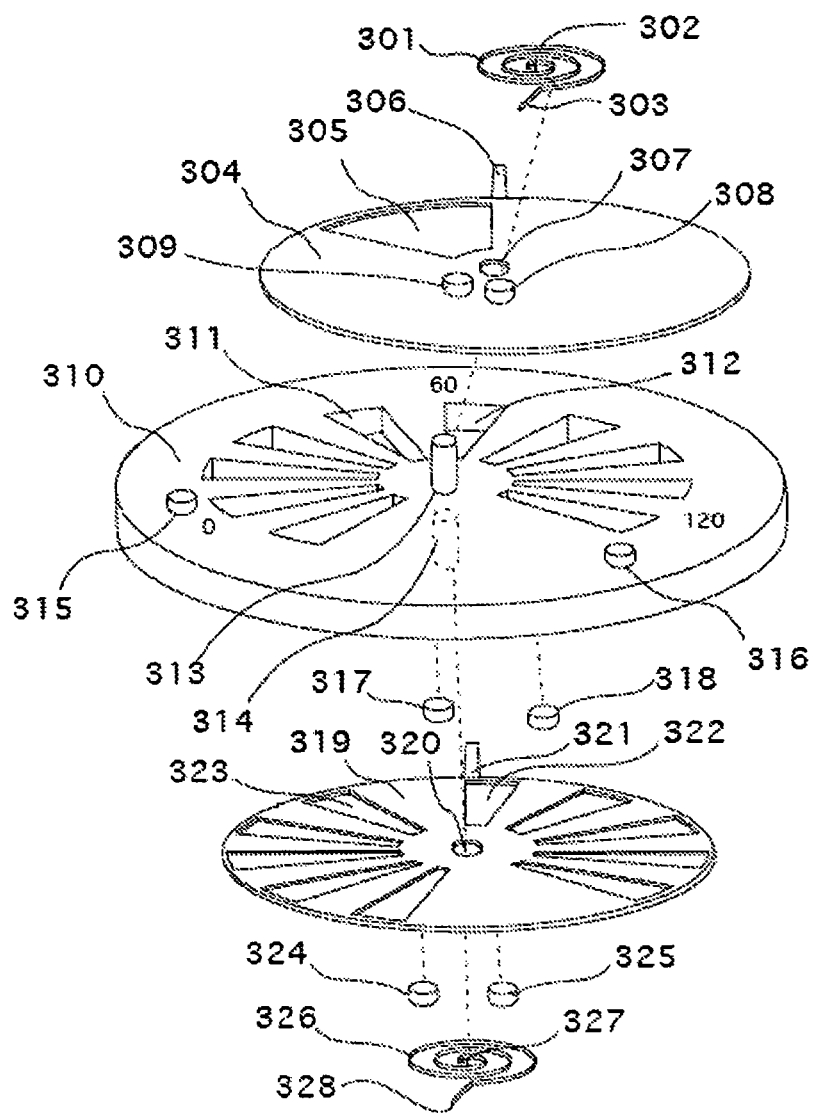
FIG. 15 is an exploded view of another embodiment of the adaptive insulator of the invention.

FIG. 15 shows an exploded view of an embodiment wherein an upper disk 304 lies just above, and can rotate in relation to a fixed barrier 310. Fixed barrier 310 can either itself span, or be integrated into another bather that spans, over an extended area and serves as a larger insulative bather underneath the roof. A lower disk 319 lies below and can also rotate in relation to fixed barrier 310. Upper disk 304 has a substantial opening 305 which serves as a passageway for convection of warm air for effectively transferring heat to and from the upper space above the adaptive insulator. Upper disk 304 has a hole 307 for receiving upper axle end 313 about which upper disk 304 may rotate in relation to fixed barrier 310. Bimetallic strip 301 attaches at point 302 to upper axle end 313 and responds to a thermal signal in the upper space. Dog 303 is provided on the end of bimetallic strip 301 to engage either of pegs 308 or 309 connected to upper disk 304 to effect rotation of upper disk 304. When bimetallic strip 301 expands in response to higher temperatures in the upper space, dog 303 engages peg 309 to rotate upper disk 304 in a clockwise direction. This effectively moves opening 305 in a clockwise direction. When bimetallic strip 301 contracts in response to lower temperatures in the upper space, dog 303 engages peg 308 to rotate upper disk 304 in a counterclockwise direction and effectively moves opening 305 in a counterclockwise direction.

Fixed barrier 310 has a series of perforations arrayed in a circular and radial fashion about central axle 313. FIG. 15 shows a series of perforations 311 arrayed in counterclockwise orientation and perforations 312 arrayed in clockwise orientation about axle 313. These perforations serve as passageways for convection of warm air for effectively transferring heat through fixed barrier 310.

Lower disk 319 has a series of perforations 323 arrayed in a circular and radial fashion in counterclockwise orientation and perforations 322 arrayed in clockwise orientation which serve as passageways for convection of warm air for effectively transferring heat to and from the lower space below the adaptive insulator. Lower disk 319 has a hole 320 for receiving lower axle end 314 about which lower disk 319 may rotate in relation to fixed barrier 310. Bimetallic strip 326 attaches at point 327 to lower axle end 314 and responds to a thermal signal in the lower space. Dog 328 is provided on the end of bimetallic strip 326 to engage either of pegs 324 or 325 on lower disk 319 to effect rotation of lower disk 319. When bimetallic strip 326 expands in response to higher temperatures in the lower space, dog 328 engages peg 324 to rotate lower disk 319 in a clockwise direction. This effectively moves perforations 323 in a clockwise direction. When bimetallic strip 326 contracts in response to lower temperatures in the lower space, dog 328 engages peg 325 to rotate lower disk 319 in a counterclockwise direction and effectively moves perforations 322 in a counterclockwise direction.

Fixed barrier 310 has numeric indicia placed around its periphery to represent temperature values as shown in FIG. 15. Upper disk 304 has indicator 306 and lower disk 319 has indicator 321 which point to a particular value of the numeric indicia on fixed barrier 310 as the disks respectively rotate. In a condition where the temperature in the upper space above the insulator barrier is cool, upper disk 304 is caused to rotate counterclockwise as discussed above. To prevent upper disk from rotating too far in a counterclockwise direction, and to keep opening 305 within an effective operative position, blocking peg 315 is disposed on the top surface of fixed barrier 310. Similarly, in a condition where the temperature in the upper space above the insulator barrier is hot, upper disk 304 is caused to rotate clockwise as discussed above. To prevent upper disk from rotating too far in a clockwise direction, and to keep opening 305 within an effective operative position, blocking peg 316 is disposed on the top surface of fixed barrier 310. Each of blocking pegs 315 and 316 provide a stopping engagement with indicator 306.

In a condition where the temperature in the lower space below the insulator barrier is cold, lower disk 319 is caused to rotate counterclockwise as discussed above. Where the temperature in the lower space below the insulator barrier is hot, lower disk 319 is caused to rotate clockwise. By rotating lower disk 319, perforations 322 and 323 are alternately brought into, or out of alignment, with corresponding perforations 311 and 312 in fixed barrier 310 to permit or impede convection of warm air for effectively transferring heat to or from the lower space below the adaptive insulator. Convection of hot air between the upper space and the lower space can only be effected if alignment occurs between each of opening 305, perforations 311 or 312 of fixed barrier 310, and perforations 322 or 323 of lower disk 319.

The lower disk 319 range of motion is constrained such that indicator 321 moves through a small arc defined in a range bounded by temperature constraint pegs 317 and 318 affixed to an underneath side of fixed barrier 310. The exemplary arc illustrated is 15 degrees. The temperature constraint pegs limit rotation of lower disk 319 so that perforations 322 and 323 can maintain an alignment position with the fixed positions of perforations 311 and 312 of fixed barrier 310. As the temperature in the lower space increases, lower disk 319 rotates clockwise to align perforations 323 with perforations 311 of fixed barrier 310 when the lower space temperature reaches the limit of warmth set by temperature constraint peg 318. If the temperature in the upper space is cool, upper disk 304 will rotate counterclockwise so that opening 305 will simultaneously align with at least one of perforations 311 of fixed barrier 310. Convection and radiation through all of the aligned perforations 305, 311 and 323 can then occur. Conversely, as the temperature in the lower space decreases, lower disk 319 rotates counterclockwise to align perforations 322 with perforations 312 of fixed barrier 310 when the lower space temperature reaches the limit of coolness set by temperature constraint peg 317. If the temperature in the upper space is warm, upper disk 304 will rotate clockwise so that opening 305 will simultaneously align with at least one of perforations 312 of fixed barrier 310. Convection and radiation through all of the aligned perforations 305, 312 and 322 can then occur.

Figure 16:
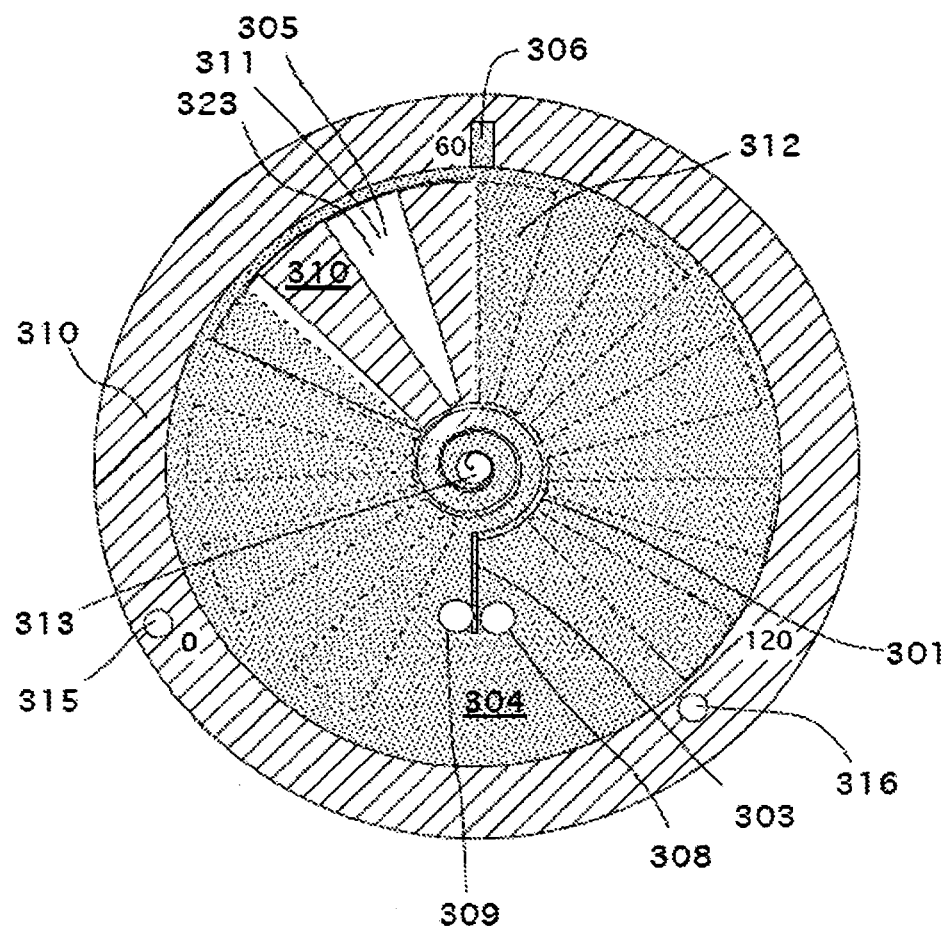
FIG. 16 is a top plan view of the adaptive insulator shown in FIG. 15.
Figure 17:
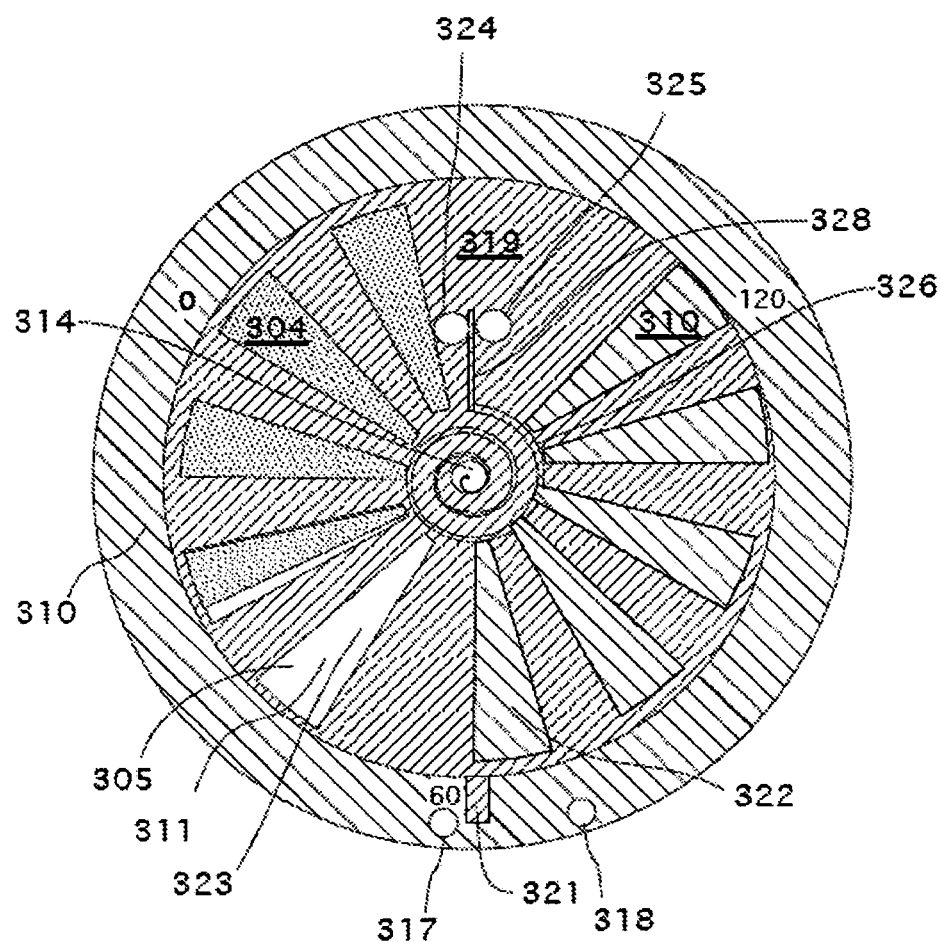
FIG. 17 is a bottom plan view of the adaptive insulator shown in FIG. 15.

FIG. 16 shows the respective alignment of the various components in a condition where the upper space is cool and the lower space is hot whereby it is desired to permit hot air to pass from the lower space through the insulative barrier to the upper space. In this configuration, opening 305 of upper disk 304 is positioned over perforations 311 of fixed barrier 310 which permits convection of air to the upper space though the insulative barrier. Upper disk 304 rotated counterclockwise into this position in response to a cooler temperature in the upper space. It can be seen that perforations 312 in fixed barrier 310 are covered by upper disk 304 to impede convection through those perforations. FIG. 17 shows the alignment of perforations 323 of lower disk 319 over perforations 311 of fixed barrier 310 which permits convection of air from the lower space though the insulative barrier. Lower disk 319 rotated into this position in response to a hotter temperature in the lower space. It can be seen that perforations 312 in fixed barrier 310 are out of alignment with perforations 322 in lower disk 319 to impede convection through those perforations. In a condition where the upper space is warm and the lower space is cold, whereby it is desired to permit warm air to pass from the upper space through the insulative barrier to the lower space, the orientation of the respective perforations described above are reversed. That is, opening 305 of upper disk 304 would be positioned over perforations 312 of fixed barrier 310, upper disk 304 being rotated clockwise into this position in response to a warmer temperature in the upper space. Perforations 311 in fixed barrier 310 would be covered by upper disk 304 to impede convection through those perforations. Perforations 322 of lower disk 319 would be aligned over perforations 312 of fixed barrier 310, lower disk 319 being rotated into this position in response to a colder temperature in the lower space. Perforations 311 in fixed barrier 310 would be out of alignment with perforations 323 in lower disk 319 to impede convection through those perforations.

The aligned perforations permit radiant heating of the lower space and optionally forced air exchange between spaces. The temperature constraint pegs can be set to correspond to upper and lower limits of acceptable lower space temperatures, such as 60 degrees Fahrenheit for the lower limit and 75 degrees for the upper limit. The illustration is exemplary of a variety of geometric configurations for the upper barrier, middle barrier, lower barrier, axle, and perforations. Reflective material can be placed on each of the upper and lower surfaces of upper disk 304, fixed barrier 310 and lower disk 319.

Sub-Roof Adaptable Insulator for a Sunlit Roof

In a preferred embodiment the sub-roof adaptable insulator for a sunlit roof is implemented as a sub-roof adaptable insulator sensing higher and lower space temperatures.

In another embodiment of the sub-roof adaptable insulator for a sunlit roof, a constant inner space temperature is assumed and only a higher space temperature sensor is implemented. At the extreme configuration attained with hot temperatures in the higher space, a reflective surface of the barrier is oriented toward the higher space, that higher space being the roof. At the extreme of rotation attained with cold temperatures in the higher space, a reflective surface of each barrier is oriented toward the lower space. An exemplary design might close the barrier with reflective surfaces toward the roof at higher space temperatures above 25 degrees Centigrade, and close the barrier with reflective surfaces away from the higher space when higher space temperatures fall below 15 degrees Centigrade. The barrier is open at intermediate temperatures, allowing convection and radiant heat transfer to and from the sunlit roof. The opening and closing temperatures of the insulator may be designed in anticipation of a general need to retain heat or to dissipate heat generated in or below the lower space. When heat retention is usually preferred, the opening temperature range may be raised and optionally narrowed. When heat dissipation is usually preferred, the opening temperature range may be reduced and optionally widened.

Sub-Roof Adaptable Insulator for a Shaded Roof

In a preferred embodiment the sub-roof adaptable insulator for a sunlit roof is implemented as a sub-roof adaptable insulator sensing higher and lower space temperatures.

In another embodiment of the sub-roof adaptable insulator for a shaded roof, it may be assumed that the shaded roof is cool and will act only as a radiator and never as a heat source, so that only a lower space temperature sensor is used to control the barrier. This may simplify the desired behavior of the barrier. In a preferred embodiment the sub-roof adaptable insulator for a shaded roof the barrier is implemented as fixed axis blinds held in place by a frame that fits between joists of a roof. Each blind rotates 45 degrees or more around its fixed axis, and is reflective on at least one side. At the limits of rotation, each edge of the blind seals against a neighboring blind or the module frame. At the extreme of rotation attained with warm lower space temperatures, the blind is open to allow convection and radiant heat exchange with the shaded roof. A reflective surface of each blind may optionally be oriented toward the roof to reduce heat gain further. At the extreme of rotation attained with cool lower temperatures, a reflective surface of each blind is oriented toward the lower space to reduce heat loss such as shown in FIG. 7.

Although an example of the reflective energy management system is shown, it will be appreciated that other embodiments can be employed. From the above description of preferred embodiments of the invention, those skilled in the art will perceive improvements, changes and modifications. Such improvements, changes and modifications within the skill of the art are intended to be covered by the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. An energy management system for a building, the system comprising:
   a) a non-transparent roof exposed to at least partial sunlight;
   b) an interior space in the building positioned below the roof;
   c) an insulator barrier positioned between the interior space and the roof; the insulator barrier comprising a radiation reflective material, the insulator barrier being adapted to selectively reflect radiation back towards its originating source and selectively permit convective radiation to pass between the interior space and the roof, a first portion of the roof oriented to receive seasonal sunlight substantially comprising radiation reflective material and a second portion of the roof facing away from seasonal sunlight and remote from the first portion substantially comprising heat radiation absorptive material.

2. The energy management system of claim 1 in which the heat radiation absorptive material is adapted for high emissivity at temperatures above 30 degrees Centigrade.

3. The energy management system of claim 1 in which the heat radiation absorptive material is adapted for low emissivity at temperatures below 10 degrees Centigrade.

4. The energy management system of claim 1 in which the insulator barrier comprises at least one movable panel member adapted to selectively orient the radiation reflective material to affect a degree of radiation reflected.

5. The energy management system of claim 1 in which the insulator barrier comprises at least one moveable panel member adapted to selectively affect a degree of convection permitted to occur between the interior space and the roof.

6. An energy management system for a building, the system comprising:
   a) a non-transparent roof exposed to at least partial sunlight;
   b) an interior space in the building positioned below the roof;
   c) an insulator barrier positioned between the interior space and the roof; the insulator barrier comprising a radiation reflective material, the insulator barrier being adapted to selectively reflect radiation back towards its originating source and selectively permit convective radiation to pass between the interior space and the roof, the insulator barrier comprising a plurality of movable panel members adapted to selectively orient the radiation reflective material to affect a degree of radiation reflected, and selectively affect a degree of convection permitted to occur between the interior space and the roof, the panel members comprising a reflective surface on one side, a first series of panel members being positioned under a portion of the roof oriented to receive seasonal sunlight, the first series of panel members being adapted to orient the reflective surface towards the roof in a closed position to reflect incident radiation from the roof away from the interior space and further being adapted to pivot to an open position to move the reflective surface away from the roof to permit convection of hot air between the interior space and the roof.

7. The energy management system of claim 6 in which the first series of panel members are adapted to pivot into a second closed position whereby the reflective surface is oriented towards the interior space to reflect incident radiation from the interior space back towards the interior space.

8. The energy management system of claim 6 in which a second series of panel members is positioned under a portion of the roof oriented out of incidence of seasonal sunlight, the second series of panel members being adapted to orient the reflective surface towards the interior space in a closed position to reflect incident radiation from the interior space back towards the interior space and further being adapted to pivot to an open position to move the reflective surface away from the interior space to permit convection of hot air between the interior space and the roof.

9. An energy management system for a building, the system comprising:
 a) a non-transparent roof exposed to at least partial sunlight;
 b) an interior space in the building positioned below the roof;
 c) an insulator barrier positioned between the interior space and the roof; the insulator barrier comprising a radiation reflective material, the insulator barrier being adapted to selectively reflect radiation back towards its originating source and selectively permit convective radiation to pass between the interior space and the roof, the insulator barrier comprising at least one movable panel member adapted to selectively orient the radiation reflective material to affect a degree of radiation reflected, and selectively affect a degree of convection permitted to occur between the interior space and the roof, the movement of the panel member being controlled by at least one temperature sensor.

10. The energy management system of claim 9 in which a mechanical actuator is operably connected to the temperature sensor to effect movement of the panel member to position the radiation reflective material in an orientation to effect a change in the degree of radiation reflected.

11. The energy management system of claim 9 in which a mechanical actuator is operably connected to the temperature sensor to effect movement of the panel member to effect a change in the degree of convection permitted to occur between the interior space and the roof.

12. The energy management system of claim 9 in which a mechanical actuator is operably connected to the temperature sensor to variably effect movement of the panel member to position the radiation reflective material in an orientation to effect a change in the degree of radiation reflected respective a first temperature range, and to change in the degree of convection permitted to occur between the interior space and the roof respecting a second temperature range.

13. A roof shingle comprising:
 a) a reflective material,
 b) a radiation absorptive material, and
 c) a transparent protective coating,
 the reflective material being disposed on the shingle to reflect incident sunlight at an angle, the radiation absorptive material being disposed on the shingle to avoid direct exposure of sunlight when the sunlight strikes the shingle at a high angle, and to receive direct sunlight and sunlight reflected from the reflective material when the sunlight strikes the shingle at a low angle, the protective coating covering the surface of the shingle exposed to sunlight.

14. The roof shingle of claim 13 in which the reflective material is comprised of metallized plastic.

15. The roof shingle of claim 13 in which the transparent protective coating is comprised of ethyl vinyl acetate.

16. The roof shingle of claim 13 in which the reflective material is disposed in the shingle in a pattern of repeating waves with the absorptive material disposed at positions at an inner portion of the downward side of each wave.

* * * * *